US010986641B2

(12) United States Patent
Chan

(10) Patent No.: US 10,986,641 B2
(45) Date of Patent: *Apr. 20, 2021

(54) FLEXIBLE BANDWIDTH ASSIGNMENT TO SPOT BEAMS

(71) Applicant: Maxar Space LLC, Palo Alto, CA (US)

(72) Inventor: Hampton Chan, Palo Alto, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,105

(22) Filed: Oct. 17, 2018

(65) Prior Publication Data

US 2019/0053214 A1 Feb. 14, 2019

Related U.S. Application Data

(62) Division of application No. 15/144,487, filed on May 2, 2016, now Pat. No. 10,136,438.

(Continued)

(51) Int. Cl.
*H04W 72/04* (2009.01)
*H04B 7/185* (2006.01)
*H04B 7/204* (2006.01)

(52) U.S. Cl.
CPC .......... *H04W 72/046* (2013.01); *H04B 7/185* (2013.01); *H04B 7/18508* (2013.01);
(Continued)

(58) Field of Classification Search
CPC ............ H04W 72/046; H04W 72/0413; H04B 7/2041; H04B 7/18513; H04B 7/18508; H04B 7/185
See application file for complete search history.

(56) References Cited

U.S. PATENT DOCUMENTS 6,175,719 B1 1/2001 Sarraf et al.
7,636,567 B2 12/2009 Karabinis et al.
(Continued)

FOREIGN PATENT DOCUMENTS

CA 2334447 A1 5/2002
CA 2932700 A1 8/2015

OTHER PUBLICATIONS

International Search Report & The Written Opinion of the International Searching Authority dated Apr. 24, 2017, International Application No. PCT/US2017/014436 filed Jan. 20, 2017.

(Continued)

*Primary Examiner* — Christine Ng
(74) *Attorney, Agent, or Firm* — Vierra Magen Marcus LLP

(57) ABSTRACT

A wireless communication platform utilizes flexible bandwidth assignment to re-allocate bandwidth between spot beams. The platform may assign a first combination of frequency and polarization (FP) to a first spot beam and a second combination of frequency and polarization to a second spot beam that is adjacent and at least partially overlapping the first spot beam. The platform may assign to the first spot beam a reserved combination of frequency and polarization during a first time period, and at second time, assign the reserved combination to the second spot beam. The platform may also assign the reserved combination simultaneously to adjacent spot beams by managing user of the reserved combination by geographically isolated terminals in the spot beams. The platform may further assign different portions of the reserved combination to adjacent spot beams without geographical limitations.

8 Claims, 14 Drawing Sheets

Related U.S. Application Data

(60) Provisional application No. 62/286,148, filed on Jan. 22, 2016.

(52) U.S. Cl.
CPC ..... *H04B 7/18513* (2013.01); *H04B 7/18541* (2013.01); *H04B 7/2041* (2013.01); *H04W 72/0413* (2013.01)

(56) References Cited

U.S. PATENT DOCUMENTS

| | | |
|---|---|---|
| 7,792,070 B1 | 9/2010 | Burr |
| 8,064,920 B2 | 11/2011 | Bell et al. |
| 8,107,875 B2* | 1/2012 | Miller ............... H04B 7/2041 |
| | | 455/3.02 |
| 8,144,643 B2 | 3/2012 | Miller et al. |
| 8,401,467 B2 | 3/2013 | Miller |
| 8,634,296 B2 | 1/2014 | Agarwal |
| 8,660,482 B2 | 2/2014 | Burr |
| 10,136,438 B2* | 11/2018 | Chan ................. H04W 72/046 |
| 2002/0187747 A1 | 12/2002 | Sawdey et al. |
| 2003/0134592 A1 | 7/2003 | Franzen et al. |
| 2004/0166801 A1 | 8/2004 | Sharon et al. |
| 2008/0146145 A1* | 6/2008 | Pateros ............. H04B 7/18515 |
| | | 455/12.1 |
| 2009/0286769 A1* | 11/2009 | DeLong ............. A61K 31/192 |
| | | 514/211.02 |
| 2012/0013425 A1* | 1/2012 | Tor ...................... H01P 1/161 |
| | | 335/256 |
| 2012/0164941 A1 | 6/2012 | Park |
| 2012/0306697 A1 | 11/2012 | Agarwal |
| 2013/0045675 A1 | 2/2013 | Park |
| 2013/0329630 A1* | 12/2013 | Becker ............. H04W 56/0015 |
| | | 370/326 |
| 2014/0197987 A1 | 7/2014 | Corman et al. |
| 2017/0215176 A1 | 7/2017 | Chan |
| 2017/0288769 A1* | 10/2017 | Miller ................ H04B 7/18515 |

OTHER PUBLICATIONS

Preliminary Amendment filed May 2, 2016, U.S. Appl. No. 15/144,487, filed May 2, 2016, by Chan.

Second Preliminary Amendment filed Jan. 19, 2017, U.S. Appl. No. 15/144,487, filed May 2, 2016 by Chan.

Restriction Requirement dated Jan. 19, 2018, U.S. Appl. No. 15/144,487, filed May 2, 2016 by Chan.

Response to Restriction Requirement dated Mar. 19, 2018, U.S. Appl. No. 15/144,487, filed May 2, 2016.

Non-final Office Action dated Apr. 5, 2018, U.S. Appl. No. 15/144,487, filed May 2, 2016 by Chan.

Response to Office Action dated Jun. 11, 2018, U.S. Appl. No. 15/144,487, filed May 2, 2016 by Chan.

Notice of Allowance dated Jul. 20, 2018, U.S. Appl. No. 15/144,487, filed May 2, 2016 by Chan.

* cited by examiner

FLEXIBLE BANDWIDTH ASSIGNMENT TO SPOT BEAMS

CLAIM OF PRIORITY

The present application is a divisional application of U.S. patent application Ser. No. 15/144,487, entitled "Flexible Bandwidth Assignment to Spot Beams," by Hampton Chan, filed May 2, 2016, published as US 2017/0215176 on Jul. 27, 2017 and issued as U.S. Pat. No. 10,136,438 on Nov. 20, 2018, which claims priority from U.S. Provisional Patent Application No. 62/286,148, entitled "Flexible Bandwidth Assignment to Spot Beams," by Hampton Chan, filed Jan. 22, 2016, both of which are incorporated by reference herein in their entirety.

BACKGROUND OF THE INVENTION

The present disclosure relates to technology for wireless communication systems.

Wireless communication systems typically include a communication platform such as a dedicated terrestrial antenna, airborne platform, or communications spacecraft such as a satellite. Such platforms typically operate within regulations that allocate at least one operating frequency bandwidth for a particular communications service and specify, among other things, a maximum signal power spectral density (PSD) of communications signals radiated to the ground, etc. A growing market exists for provision of high data rate communication services to individual consumers and small businesses which may be underserved by or unable to afford conventional terrestrial services. To advantageously provide high data rate communication services to such users, a communications platform must (1) provide a high PSD so as to enable the use of low cost user terminals, and (2) efficiently use the licensed bandwidth so as to maximize the communications throughput for a particular licensed bandwidth.

Typically, frequency reuse plans are developed prior to design and deployment of a communications system in order to service the projected needs of the system. In many cases, particularly in the case of space-based communications, these frequency reuse plans may be formed into the hardware of the device such that post deployment alterations are not feasible. Despite the best planning techniques, many communications platforms experience underutilized capacity in some areas while other areas do not have sufficient bandwidth to service the desired capacity.

DETAILED DESCRIPTION

Figure 1:
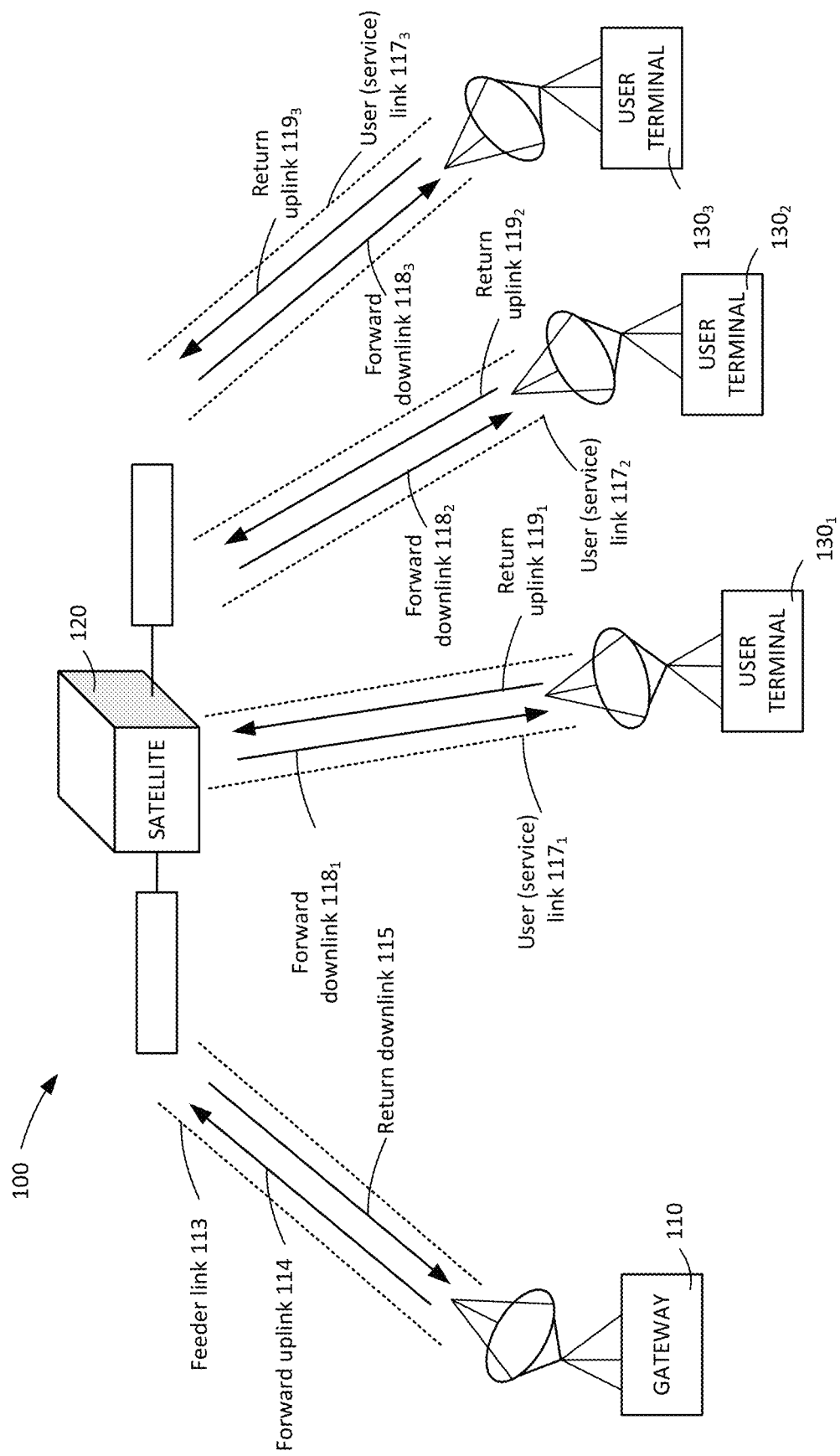
FIG. 1 is a block diagram describing a wireless communications system in which embodiments of the disclosed technology may be practiced.

The disclosed technology is directed to bandwidth allocations in wireless communication systems that provide frequency re-use. Wireless communication systems are disclosed that provide multiple spot beams to cover a geographic service region. The spot beams are associated with individual coverage regions within the overall geographic service region. The spot beams may be associated with one or more gateway terminals and/or one or more user terminals.

Frequency re-use is employed whereby unique combinations of frequency and polarization are associated with multiple spot beams. In one example, user terminal spot beams that are adjacent to one another utilize separate frequency/polarization combinations while at least some of the user terminal spot beams that are geographically isolated re-use the same frequency/polarization combinations. Likewise, gateway spot beams may re-use the same frequency/polarization combinations as other gateway spot beams from which it is geographically isolated and/or frequency/polarization combinations as other user terminal spot beams from which is isolated.

In accordance with various embodiments, the wireless communication platform utilizes flexible bandwidth assignment to re-allocate bandwidth between spot beams. For example, the platform may configure a first combination of frequency and polarization (hereinafter "FP combination") for inclusion in a first spot beam and a second FP combination for inclusion in a second spot beam that is adjacent and at least partially overlapping the first spot beam. The platform may configure the first spot beam to include a reserved FP combination during a first time period, and at second time configure the second spot beam to include the reserved FP combination. In this manner, the platform is capable of flexibly configuring bandwidth for adjacent and at least partially overlapping spot beams, for example, in response to unequal bandwidth demands between the spot beams. In various embodiments, frequency/polarization combinations may be re-allocated between forward downlinks to user terminals in adjacent spot beams and/or re-allocated between return uplinks from user terminals in the spot beams. Moreover, FP combinations may be re-allocated between forward uplinks from gateways and/or re-allocated between return downlinks to the gateways.

In accordance with one embodiment, the system configures a reserved FP combination for inclusion in adjacent and at least partially overlapping spot beams at the same time. The platform may broadcast the reserved FP combination within both spot beams at the same time. In one example, a controller assigns the reserved FP combination to terminals in only one of the spot beams at a given time. In another example, the system assigns the reserved FP combination to terminals in both spot beams at the same time. The platform reserves communication using the reserved FP combination for geographically isolated user terminals within the adjacent spot beams. Only user terminals that are able to close the communication link using the same reserved FP combination under acceptable levels of interference are assigned channels within the reserved FP combination.

In accordance with one embodiment, the system assigns subsets of channels within a reserved FP combination to adjacent spot beams. For example, a first subset of channels within the reserved FP combination may be assigned to a set of users in the first spot beam while a second subset of channels within the reserved FP combination is assigned to a set of users in the second spot beam.

In various embodiments, reallocations of bandwidth may be made in response to monitored bandwidth demands and/or prior knowledge of expected demands. For example, a reserved FP combination may be reallocated between spot beams according to time zones. During peak demands within a first time zone, the reserved FP combination may be allocated to a spot beam in the first time zone (e.g., Eastern U.S.). As the demand wanes in the first time zone and increases in an adjacent time zone (e.g., a nearby region such as the Central U.S. or to a geographically distant region in the new time zone such as Mexico), the system may reallocate the reserved FP combination to a spot beam in the adjacent time zone that is adjacent to the spot beam in the first time zone or to a second spot beam that is not adjacent to the first spot beam. Previous spacecraft such as SATMEX 6 have provided coverage to both Mexico and the U.S., which has a sizable distributed Spanish-speaking population. In some embodiments Brazil may be the focus of coverage prior to the Eastern U.S. due to its high traffic and easterly location.

In one embodiment, a communication platform including a satellite provides filter circuitry to generate a plurality of spot beams. A first filter circuit may be used to generate a first spot beam including a first FP combination. A second filter circuit may be used to generate a second spot beam including a second FP combination. A third filter is used to provide a reserved FP combination. The filter circuitry includes a switch and a first output multiplexer for the first spot beam and a second output multiplexer for the second spot beam. A switch is provided to selectively switch the output of the third filter circuit between the first output multiplexer and the second output multiplexer. In a first position, the output of the filter circuit including the reserved FP combination is routed to the first multiplexer where it is combined with an output of the first filter circuit passing the first FP combination. Thus, the output of the first multiplexer provides the first FP combination and the reserved FP combination for the first spot beam when the switch is in the first position. In a second position, the output of the third filter circuit is routed to the second multiplexer where it is combined with an output of the second filter circuit passing the second FP combination. Thus, the output of the second multiplexer provides the second FP combination and the reserved FP combination for the second spot beam when the switch is in the second position.

In one embodiment, the communication platform provides the reserved FP combination in multiple spot beams without switchable filter circuitry to selectively pass the reserved FP combination. The platform includes a first filter circuit for a first spot beam and a second filter circuit for an adjacent second spot beam. The first filter circuit passes a first FP combination and a reserved FP combination. The second filter circuit passes a second FP combination and the reserved FP combination. In this manner, the first spot beam and the second spot beam may simultaneously contain energy from the reserved FP combination. The system manages the allocation of channels within the reserved FP combination to avoid interference in the adjacent coverage regions. A controller in a gateway, satellite, or elsewhere may allocate channels within the reserved FP combination to achieve acceptable levels of interference.

The system allocates channels within the reserved FP combination to a subset of terminals in the first spot beam that are geographically isolated from a subset of terminals in the second spot beam in one example. In another example, the system allocates a first subset of channels within the reserved FP combination to a subset of terminals in the first spot beam and a second subset of channels within the reserved FP combination to a subset of terminals in the second spot beam. In the latter example, the first subset of terminals and the second subset of terminals do not have to be geographically isolated.

FIG. 1 depicts a simplified diagram of a portion of a wireless communications environment in which embodiments of the presently disclosed technology may be practiced. In the example of FIG. 1, a communications platform according to one embodiment includes a satellite 120 forming part of a wireless communications network 100. Satellite 120 may be located, for example, at a geostationary or non-geostationary orbital location. Satellite 120 may be communicatively coupled, via at least one feeder link antenna, to at least one gateway 110 of the communications platform and, via at least one user link antenna to a plurality of user terminals 130. The term user terminals 130 may be used to refer to a single user terminal or user terminals such as user terminals 1301, 1302, 1303 collectively. A user terminal is adapted for communication with the wireless communication platform including as satellite 120. User terminals may include fixed and mobile user terminals including, but not limited to, a cellular telephone, wireless handset, a wireless modem, a date transceiver, a paging or position determination receive, or mobile radio-telephone. A user terminal may be hand-held, portable (including vehicle-mounted installations for cars, trucks, boats, trains, planes, etc.) or fixed as desired. A user terminal may be referred to as a wireless communication device, a mobile station, a mobile wireless unit, a user, a subscriber, or a mobile.

The at least one gateway 110 may be coupled to a network such as, for example, the Internet, terrestrial public switched telephone network, mobile telephone network, etc. A gateway 110 and the satellite 110 communicate over a feeder link 113, which has both a forward uplink 114 and a return downlink 115. Feeder link 113 may operate for example, in an assigned or allocated frequency band (e.g, between 17 and 80 GHz). Although a single gateway is shown, typical implementations will include many gateways, such as five, ten, or more. Each gateway may utilize its own gateway beam, although more than one gateway can be positioned within a beam.

User terminals 130 and the satellite 120 communicate over user links 117 that have both a forward downlink 118 and a return uplink 119. Three user terminals with three user links $117_1$-$117_3$ are shown by way of example. Typical implementations will include many user terminals. Moreover, many user terminals may be located within the geographic coverage area of a single user beam. Many user beams may be included in various implementations. For example, fifty, one hundred, or more (or fewer) user beams may be used to generate a service region. User link 117 may operate in an assigned frequency band that is different than or the same as the frequency assigned to feeder link 113. For example, the user links may operate in the same assigned frequency band as the gateway, such as where the gateway is located in a coverage area spatially separated from the coverage areas of the user beam or user beams for which the frequency is re-used. In other examples, one or more gateways may be located in the same coverage area as a user beam coverage area. The gateway would share the available frequency spectrum since there is no spatial separation in this case.

A spacecraft antenna subsystem may provide an antenna beam pattern wherein an entire service region is covered using the available bandwidth at a single time. In another example, however, multiple satellite antenna beams (or cells) are provided, each of which can serve a substantially distinct cell within an overall service region. In one embodiment, satellite 120 is a multi-beam spacecraft having an antenna subsystem for providing a grid of antenna spot beams. The shape of the grid in turn defines a service region. The grid of individual spot beams (user beams) divides an overall service region into a number of smaller cells. For example, U.S. patent application Ser. No. 11/467,490 describes a pattern of 135 spot beams covering the continental United States (CONUS), Hawaii, Alaska, and Puerto Rico. It is noted that a service region may be defined in any manner to cover any desired geographic location. In one embodiment, the antenna subsystem includes a phased array antenna, a direct radiating antenna, or a multi-feed fed reflector.

Dividing the overall service region into a plurality of smaller cells permits frequency reuse, thereby substantially increasing the bandwidth utilization efficiency. In some examples of frequency reuse, a total bandwidth allocated to the downlink is divided into separate non-overlapping blocks for the forward downlink 118 and the return downlink 115. Similarly, the total bandwidth allocated to the uplink is divided into separate non-overlapping blocks for the forward uplink 114 and the return uplink 119.

In other examples, some or all of the allocated bandwidth is reused by the gateway(s) 110, thereby providing for simultaneous operation of at least a portion of the feeder link 113 and a portion of the user link 117 at common frequencies. More specifically, forward uplink 114 and return uplink 119 may reuse the same frequency and forward downlink 118 and return downlink 115 may reuse the same frequency. Simultaneous operation of the feeder link 113 and the user link 117 at common frequencies means that the gateway(s) 110 may reuse any part of the total bandwidth allocated to the user antenna beams. This may be accomplished in various ways.

The architecture of FIG. 1 is provided by way of example and not limitation. Embodiments of the disclosed technology may be practiced using numerous types of implementations. For example, some communications systems may only include a single terminal type, such as user terminals that communicate with one another. In such systems, gateways may not be used.

Figure 2:
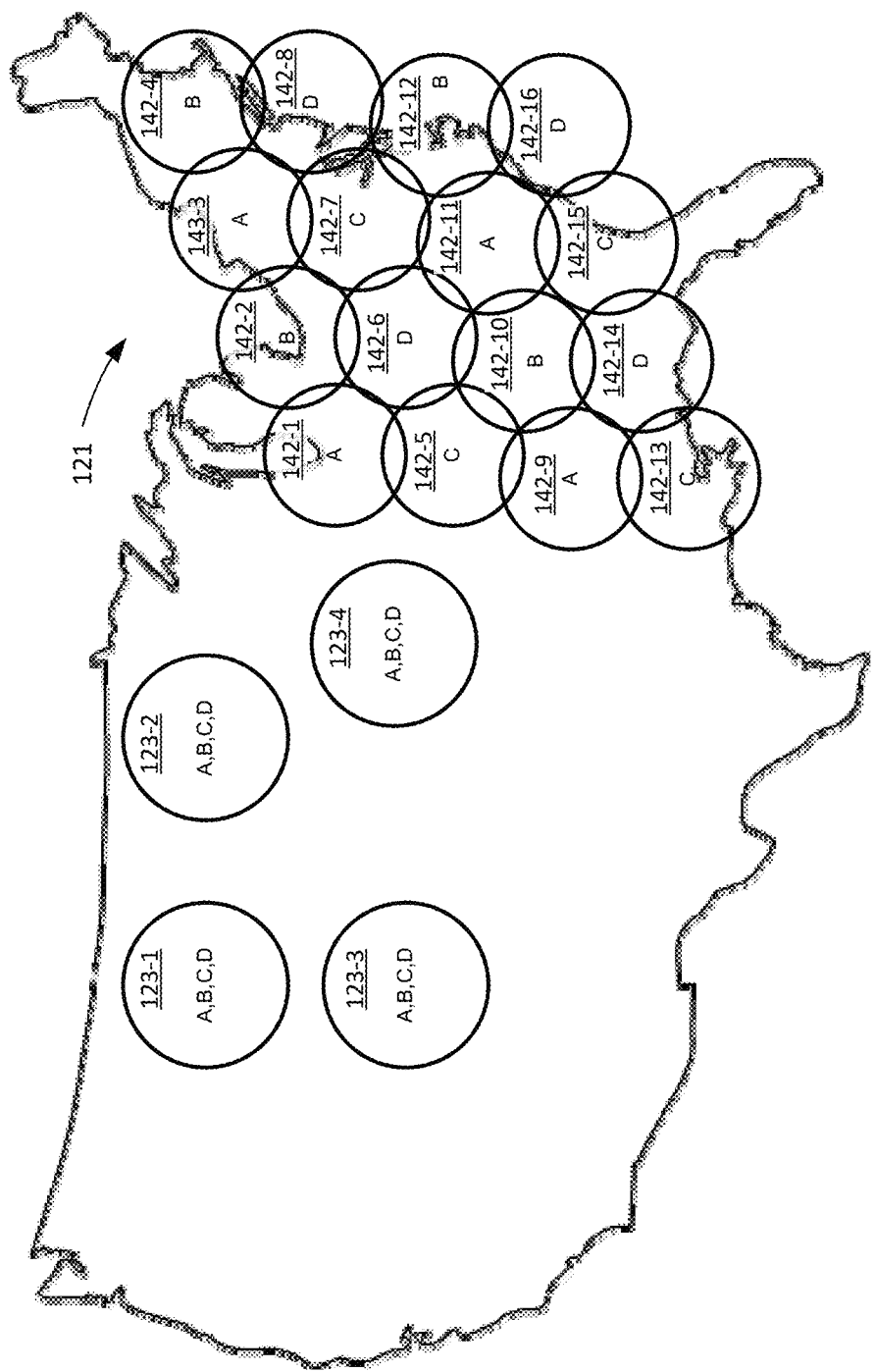
FIG. 2 is a map describing the placement of gateways and user beams and an example of a frequency reuse plan.

FIG. 2 depicts a specific example of an antenna coverage pattern that provides for spatial separation between the gateway(s) 110 in gateway beams 123 and a service region 121 of user beams 142 to enable non-interfering use of the same frequency by the gateway(s) 110 and user terminals 130. FIG. 2 is provided by way of example only, as it will be apparent that any number and type of coverage patterns may be used in accordance with embodiments of the disclosed technology. As shown in FIG. 2, the service region 121 is defined as the footprint made by a plurality of user beams 142. The term user beam 142 may be used to refer to a single user beam or multiple user beams such as 142-1 to 142-16 collectively. These user beams correspond to the geographic coverage area serviced by a particular user link 113. A user terminal 130 located within the footprint of any of the user beams 142 may be communicatively coupled over a user link 117 to spacecraft 120. Each gateway 110 is located in a gateway beam 123. Spacecraft 120 may be communicatively coupled over feeder link 113 to any one of the gateways 110. Each gateway 110 may also be proximate to, and communicatively coupled with, a high speed Internet backbone access point. Each of the gateway beams is substantially spatially isolated from the service region 121. Because of this spatial isolation, the user link 117 is operable at the same frequency(ies) as the feeder link 113. Moreover, the frequency band common to both the feeder link 113 and the user link 117 may encompass substantially all of the allocated bandwidth.

Frequency reuse by two or more user beams 142 may be used. For example, any two user beams may employ the same frequency without regard to antenna polarization where the two user beams are spatially isolated (i.e., not adjacent or overlapping). Adjacent user beams may use a common frequency where each adjacent user beam operates at a different antenna polarization. Frequency re-use within a plurality of user beams 142 may also use, for example, what is referred to as a "color" re-use plan.

Figures 3A, 3B:
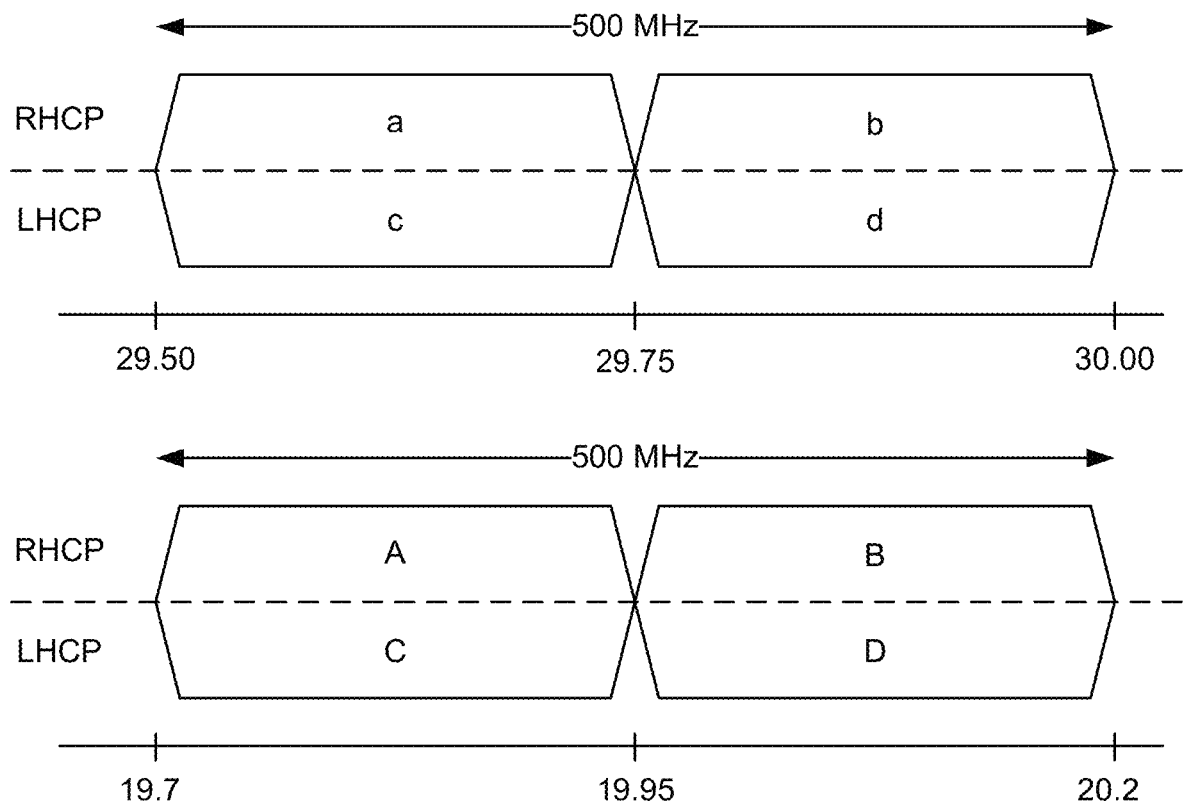
FIG. 3A is a diagram describing an example of unique combinations of frequency and polarization that may be used in a frequency reuse plan.
FIG. 3B is a diagram describing the frequency assignments for uplinks and downlinks using the frequency/polarization combinations in FIG. 3A.

FIG. 3A is a diagram showing a frequency band allocation in a communications system for a set of uplink signals and downlink signals. A specific example is described of a color re-use plan. Each color represents a unique combination of frequency band and antenna polarization. In this example, color 'a' represents a first sub-band (29.50 GHz-29.75 GHz) of an allocated uplink frequency band (29.50 GHz-30.00 GHz) with a right-hand circular polarization (RHCP). Color 'b' represents a second sub-band (29.75 GHz-30.00 GHz) of the allocated uplink frequency band with RHCP. Color 'c' represents the first sub-band of the allocated uplink frequency band with a left-hand circular polarization (LHCP). Color 'd' represents the second sub-band of the allocated uplink frequency band with LHCP.

Similarly for the downlink, color 'A' represents a first sub-band (19.70 GHz-19.95 GHz) of the allocated downlink frequency band (19.70 GHz-20.20 GHz) with RHCP. Color 'B' represents a second sub-band (19.95 GHz-20.20 GHz) of the allocated downlink frequency band with RHCP. Color 'C' represents the first sub-band of the allocated downlink frequency band with LHCP. Color 'D' represents the second sub-band of the allocated downlink frequency band with LHCP. The colors may include other allocations of the frequency band and polarization.

FIG. 3B is a table showing an example of an allocation of the unique frequency/polarization combinations to the uplink and downlink signals for feeder and user beams. The forward uplinks and return uplinks share the 29.50 GHz-30.00 GHz spectrum such that colors a-d can be re-used. Colors 'a' and 'c' in the 29.50 GHz to 29.75 GHz band are colors assigned to spot beams for both forward uplinks and return uplinks. Colors 'b' and 'd' in the 29.75 GHz to 30.00 GHz band are colors assigned to spot beams for both forward uplinks and return uplinks. The forward uplinks are used for gateway to satellite communication in one example. If the gateways are geographically isolated all of the colors 'a'-'d' may be re-used by all of the gateways. If a gateway beam is adjacent to another gateway beam or is adjacent to a user beam, the assignments may be made in such a way that the gateway beam does not use the same color for any beam to which it is adjacent. The return uplinks are used for user terminal to satellite communication in one example. Each user spot beam may be assigned one dedicated color 'a'-'d', for example, as shown in FIG. 2. The assignments may be made such that adjacent user beams do not share the same color.

Similarly, the forward downlinks and return downlinks share the 19.70 GHz-20.20 GHz spectrum such that colors A-D can be re-used between the forward and return downlinks. Colors 'A' and 'C' in the 19.70 GHz to 19.95 GHz band are colors assigned to spot beams for both forward downlinks (e.g., user terminals) and return downlinks (e.g., gateways) as well as colors 'B' and 'C' in the 19.95 GHz to 20.20 GHz band. The return downlinks are used for satellite to gateway communication in one example. If the gateways are geographically isolated all of the colors 'A'-'D' may be re-used by all of the gateways. If a gateway beam is adjacent to another gateway beam or is adjacent to a user beam, the assignments may be made in such a way that the gateway beam does not use the same color for any beam to which it is adjacent. The forward downlinks are used for satellite to user terminal communication in one example. Each user spot beam may be assigned one dedicated color 'A'-'D', for example, as shown in FIG. 2. The assignments may be made such that adjacent user beams do not share the same color.

Typically, an assignment of colors to user beams 142 provides that two adjacent user beams do not share both a common frequency and a common polarization for use at a given time. In the disclosed example, adjacent beams do not share the same color such that the unique combinations of frequency and polarization are not shared between beams. In FIG. 2, an example is shown where each gateway beam is spatially separated from each of the user beams as well as the other gateway beams. Accordingly, each gateway may operate in its feeder beam at every color without interfering with communication in the other user beams and gateway beam. The individual user beams operate at one of the four available colors such that no two adjacent user beams share the same color. In this manner, frequency reuse between user beams does not lead to interference where the coverage areas at least partially overlap.

It is noted that in FIG. 2 only the uppercase lettering designating the downlink signals in the feeder and user beams is shown for simplicity. Similarly, each beam operates at the frequency/polarization combination for uplink signals at the corresponding lowercase color. Moreover, a four color re-use plan is provided as an example only as any number of colors may be used in a given frequency re-use plan. For example, three color re-use plans are common whereby a first color represents a first frequency band and first polarization, a second color represents a second frequency band and the first polarization, and a third color represents the entire frequency band at the second polarization. For a further discussion of frequency re-use, refer to U.S. Pat. No. 7,793,070, entitled "Multi-Beam Satellite Network to Maximize Bandwidth Utilization." It is noted that the service region and antenna pattern of FIG. 2 is a simplified example. The disclosed concepts may be practiced in any geographic service region. Numerous examples and implementations may be practiced within the scope of the disclosure.

Figure 4:
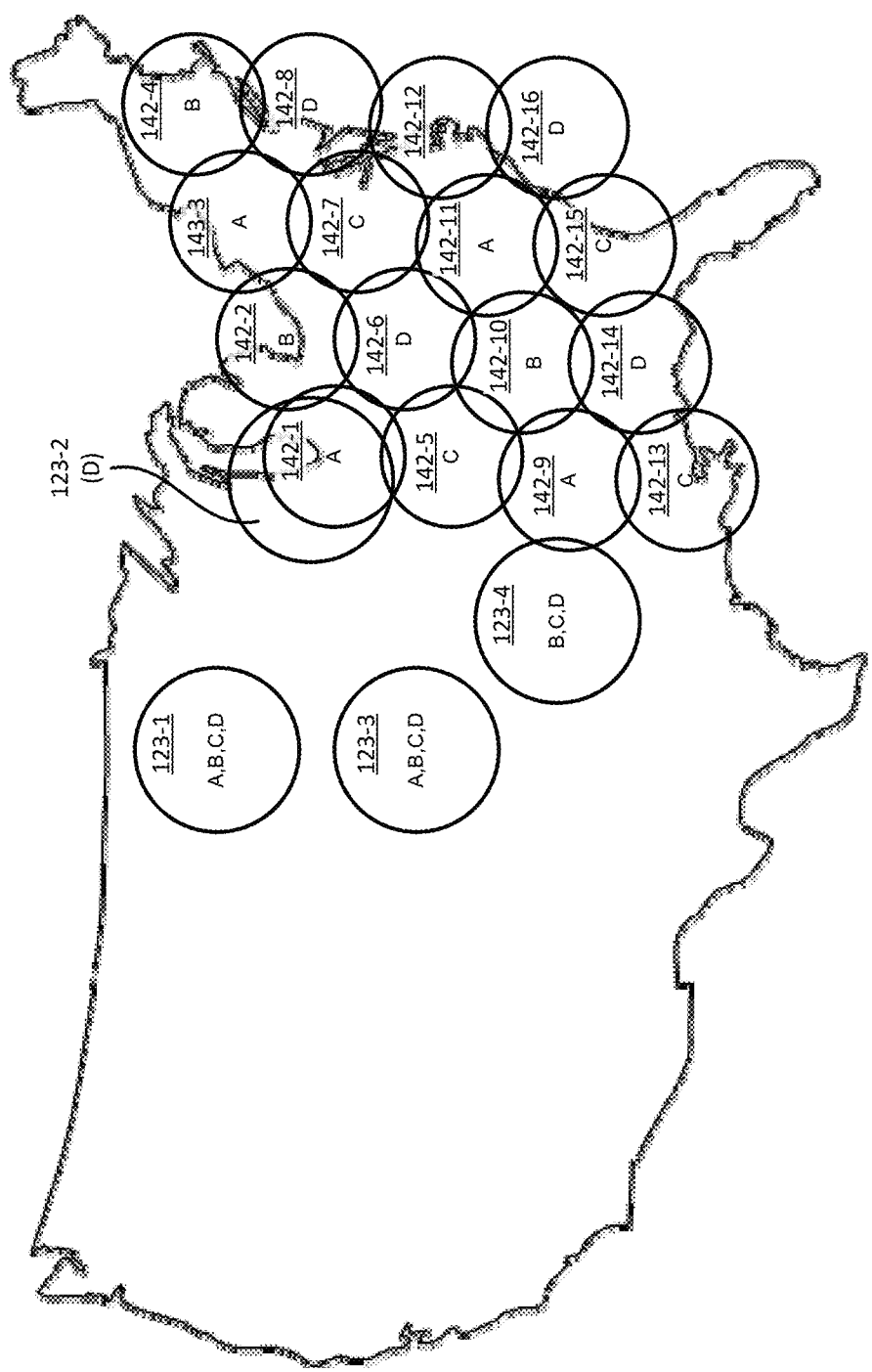
FIG. 4 is a diagram describing another example of unique combinations of frequency and polarization that may be used in a frequency reuse plan.

Another example is shown in FIG. 4 where some of the gateway beams are adjacent to or overlapping with one or more user beams. For example, gateway beam 123-4 is adjacent to a user beam 142-9 and gateway beam 123-2 is overlapping or adjacent to user beams 142-1, 142-2, and 142-3. Because user beams are adjacent to the gateway beams, the gateway beams operate at a subset of the colors in the allocated frequency band to avoid interference. Specifically in this example, user beam 142-9 is allocated the frequency/polarization combination 'A.' Accordingly, gateway beam 123-4 is assigned the remaining colors 'B,' 'C,' and 'D' without assignment of color A. Gateway beam 123-4 will operate at the reduced frequency allocation to avoid interference in the color 'A' frequency band in user beam 142-9. User beam 142-1 is allocated color 'A', user beam 142-5 is allocated color 'C' and user beam 142-2 is allocated color 'B.' Accordingly, gateway beam 123-2 is assigned color 'D' only without assignment of colors 'A,' 'B,' and 'C' to avoid interference in the other user beams.

In accordance with one embodiment, one or more reserved colors are provided by a communications platform for flexible assignment of bandwidth between spot beams. A reserved color represents a unique combination of frequency band and antenna polarization that can be reallocated or reassigned between spot beams. Accordingly, flexible bandwidth allocations can be made dynamically in response to bandwidth requirements and changes in usage patterns. The reserved color may be reassigned between adjacent and at least partially overlapping spot beams using different techniques to avoid interference between the two spot beams.

Figures 5A, 5B:
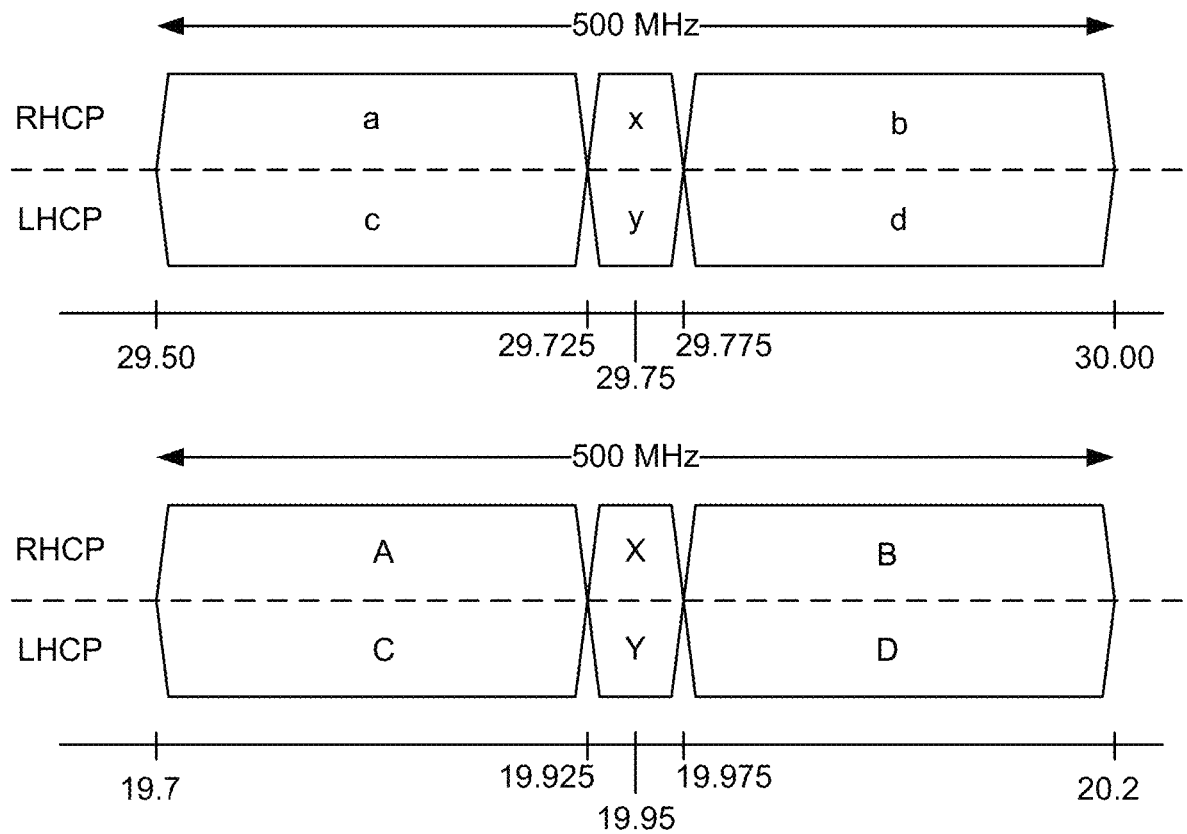
FIG. 5A is a diagram describing an example of unique combinations of frequency and polarization including dedicated and reserved combinations in accordance with one embodiment.
FIG. 5B is a diagram describing the frequency assignments for uplinks and downlinks using the frequency/polarization combinations in FIG. 5A.

FIG. 5A is a diagram showing a flexible frequency band and antenna polarization allocation in a communications system for a set of uplink signals and downlink signals in accordance with one embodiment. In FIG. 5A, the same frequency bands are utilized for a set of feeder and return downlink signals and a set of feeder and return uplink signals as shown in FIG. 3A. In FIG. 5A, however, the dedicated colors (a-d; A-D) represent a smaller subset of the allocated frequency bands. The remaining portions of the frequency bands are reserved for flexible assignment between different spot beams.

In the specific example of FIG. 5A, the uplink frequency band is again divided into four dedicated colors. However, color 'a' represents a reduced 225 MHz spectrum in the frequency band 29.50 GHz and 29.725 GHz having a RHCP. Color 'b' represents a 225 MHz spectrum in the frequency band 29.775 GHz and 30.00 GHz having a RHCP. Color 'c' represents a 225 MHz spectrum in the frequency band 29.50 GHz and 29.725 GHz having a LHCP. Color 'd' represents a 225 MHz spectrum in the frequency band 29.775 GHz and 30.00 GHz having a LHCP.

In the uplink frequency spectrum, 50 MHz of spectrum is reserved in the frequency band 29.725 GHz to 29.775 GHz. The reserved frequency band is used to create two additional reserved colors 'x' and 'y.' Color 'x' represents 50 MHz of spectrum in the frequency band 29.725 GHz to 29.775 GHz having RHCP. Color 'y' represents 50 MHz of spectrum in the frequency band 29.725 GHz and 29.775 having LHCP.

The downlink frequency band is also divided into four dedicated colors. Color 'A' represents a 225 MHz spectrum in the frequency band 19.70 GHz and 19.925 GHz having a RHCP. Color 'B' represents a 225 MHz spectrum in the frequency band 19.975 GHz and 20.20 GHz having a RHCP. Color 'C' represents a 225 MHz spectrum in the frequency band 19.70 GHz and 19.925 GHz having a LHCP. Color 'D' represents a 225 MHz spectrum in the frequency band 19.975 GHz and 20.20 GHz having a LHCP.

In the downlink frequency spectrum, 50 MHz of spectrum is reserved in the frequency band 19.925 GHz to 19.975 GHz. The reserved frequency band is used to create two additional reserved colors 'X' and 'Y.' Color 'X' represents 50 MHz of spectrum in the frequency band 29.725 GHz to 29.775 GHz having RHCP. Color 'Y' represents 50 MHz of spectrum in the frequency band 29.725 GHz and 29.775 having LHCP.

Colors 'x,' 'y,' 'X,' and 'Y' are reserved such that they may be flexibly and dynamically assigned between multiple spot beams. These colors are not dedicated to one spot beam within a cluster of adjacent and overlapping spot beams as in typical frequency reuse schemes. Instead, these colors are associated with two or more adjacent spot beams and are capable of flexibly being assigned to the spot beams.

FIG. 5B is a table depicting the color assignments for the feeder links and return links in one example. The forward uplinks and return uplinks share the 29.50 GHz-30.00 GHz spectrum such that colors a-d and x, y can be completely re-used between the forward and return uplinks. Colors 'a' and 'c' in the 29.50 GHz to 29.725 GHz band are dedicated colors assigned to spot beams and colors 'b' and 'd' in the 29.775 GHz to 30.00 GHz band are dedicated colors assigned to spot beams. The forward uplinks are used for gateway to satellite communication in one example. If the gateways are geographically isolated all of the colors 'a'-'d' and 'x'-'y' may be re-used by all of the gateways. If a gateway beam is adjacent to another gateway beam or is adjacent to a user beam, the assignments may be made in such a way that the gateway beam does not use the same color for any beam to which it is adjacent. The return uplinks are used for user terminal to satellite communication in one example. Each user spot beam may be assigned one dedicated color 'a'-'d', for example, as shown in FIG. 2. The assignments may be made such that adjacent user beams do not share the same color. The reserved colors 'x' and 'y' may be flexibly assigned to adjacent spot beams. In this manner, the user beams do not receive a dedicated allocation of the color 'x' or 'y'. Instead, a selected user beam may be assigned one of the colors 'x' and 'y' and one time, but at another time, the color may be assigned to an adjacent user beam and not the selected user beam.

Similarly, the forward downlinks and return downlinks share the 19.70 GHz-20.20 GHz spectrum such that colors A-D and X,Y can be completely re-used between the forward and return downlinks. Colors 'A' and 'C' in the 19.70 GHz to 19.925 GHz band are dedicated colors assigned to spot beams and colors 'B' and 'C' in the 19.975 GHz to 20.20 GHz band are dedicated colors assigned to spot beams. The return downlinks are used for satellite to gateway communication in one example. If the gateways are geographically isolated all of the colors 'A'-'D' and 'X'-'Y' may be re-used by all of the gateways. If a gateway beam is adjacent to another gateway beam or is adjacent to a user beam, the assignments may be made in such a way that the gateway beam does not use the same color for any beam to which it is adjacent. The forward downlinks are used for satellite to user terminal communication in one example. Each user spot beam may be assigned one dedicated color 'A'-'D', for example, as shown in FIG. 2. The assignments may be made such that adjacent user beams do not share the same color. The reserved colors 'X' and 'Y' may be flexibly assigned to adjacent spot beams. In this manner, the user beams do not receive a dedicated allocation of the color 'X' or 'Y'. Instead, a selected user beam may be assigned one of the colors 'X' or 'Y' and one time, but at another time, the color may be assigned to an adjacent user beam and not the selected user beam. In this manner, the two adjacent spot beams may share the reserved color without creating interference.

FIGS. 6A-6D describe a flexible bandwidth allocation for a set of spot beams in accordance with one embodiment. A cluster of spot beams is depicted that includes spot beams that are adjacent and at least partially overlapping with at least one other spot beam in the cluster. The provided examples show a color re-use technique with four dedicated color assignments and two reserved color assignments that may be flexibly allocated for adjacent spot beams. The colors in one specific example may correspond to the color assignments for unique combinations of frequency band and antenna polarization as shown in FIG. 5A, but other frequencies, polarizations, and divisions may be used. A small number of spot beams and corresponding coverage areas are shown by way of example, but it will be appreciated that the concepts may be extended to any number of spot beams or used with fewer spot beams. While an example is described with respect to forward downlink signals in a user beam from a satellite to user terminals, the concepts are equally applicable to return uplink signals as well. Moreover, while the example is described with respect to user spot beams, the described frequency re-use may be used with gateway beams that are adjacent.

The spot beams are roughly arranged into four rows. A first row includes spot beams 142-1 to 142-4, a second row includes spot beams 142-5 to 142-8, a third row includes spot beams 142-9 to 142-12, and a fourth row includes spot beams 142-13 to 142-16. Each spot beam is assigned a dedicated color. The spot beams in the first row alternate dedicated color assignments 'A' and 'B,' beginning with an 'A' color assignment for spot beam 142-1 and ending with a 'B' color assignment for spot beam 142-4. The spot beams in the second row alternate dedicated color assignments 'C' and 'D,' beginning with a 'C' color assignment for spot beam 142-5 and ending with a 'D' color assignment for spot beam 142-8. The spot beams in the third row alternate dedicated color assignments 'A' and 'B,' beginning with an 'A' color assignment for spot beam 142-9 and ending with a 'B' color assignment for spot beam 142-12. The spot beams in the fourth row alternate dedicated color assignments 'C' and 'D,' beginning with a 'C' color assignment for spot beam 142-13 and ending with a 'D' color assignment for spot beam 142-16.

The dedicated color assignment does not change for any of the spot beams. Typically, the dedicated color assignment is hardwired aboard the satellite in the form of the filter circuit design for a given spot beam. For example, the filter circuit for a given spot beam will filter uplink signals to generate in the spot beam downlink signals at the frequency band and antenna polarization of the assigned color. In this manner, the dedicated color assignment for a spot beam is permanent. Similarly, the filter circuit for a given spot beam can be designed to filter uplink signals from a given spot beam coverage area for only those signals within the assigned color for the uplink signals of the spot beam. Accordingly, in FIGS. 6A-6D, the dedicated color assignments for each spot beam do not change over time, while the reserved color assignments do.

Figure 6A:
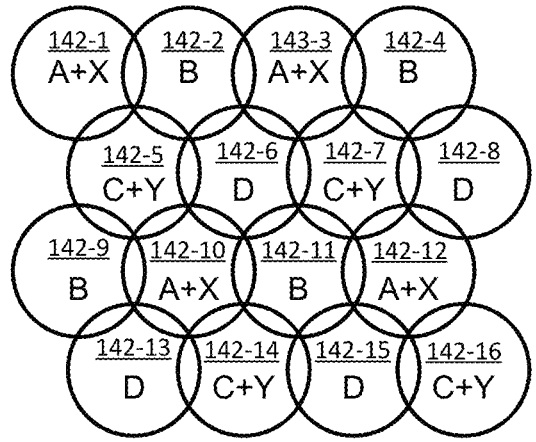
FIGS. 6A-6D are diagrams depicting a set of spot beams and a flexible allocation of a reserved combination of frequency and polarization in accordance with one embodiment.

FIGS. 6A-6D depict a specific example of some possible color assignments to the cluster of spot beams, illustrating how the reserved colors may be flexibly assigned to different ones of the spot beams while maintaining acceptable levels of signal-to-interference ratios. In FIG. 6A, the color 'X' is assigned to each of the spot beams having a dedicated 'A' color assignment. Accordingly, spot beams 142-1, 142-3, 142-10, and 142-12 have color 'X' assigned to them such that they may operate using the frequency/polarization combinations corresponding to colors 'A' and 'X.' As such, the bandwidth is increased in these spot beams to include 275 MHz of the allocated downlink spectrum in the example of FIG. 5A. Each of the spot beams 142-2, 142-4, 142-9, and 142-11 are allocated 225 MHz of downlink spectrum by virtue of their color 'B' dedicated assignment. As will be described in more detail hereinafter, a satellite or other communication platform may include a filter circuit that can selectively generate signals in the color 'X' FP combination for one of two adjacent spot beams. In another example, signals having the color 'X' FP combination may be generated for both the 'A' and 'B' spot beams, while a controller at a gateway, satellite or elsewhere manages the FP combination such that channels within the combination are only used in one of two adjacent spot beams.

The reserved color 'Y' is assigned to each of the spot beams having a dedicated 'C' color assignment. Accordingly, spot beams 142-5, 142-7, 142-14, and 142-16 have color 'Y' assigned to them such that they may operate using the frequency/polarization combinations corresponding to colors 'C' and 'Y.' As such, the bandwidth is increased in the 'C' color spot beams to include 275 MHz of the allocated downlink spectrum while the bandwidth in the 'D' color spot beams includes 225 MHz of spectrum.

Figure 6C:
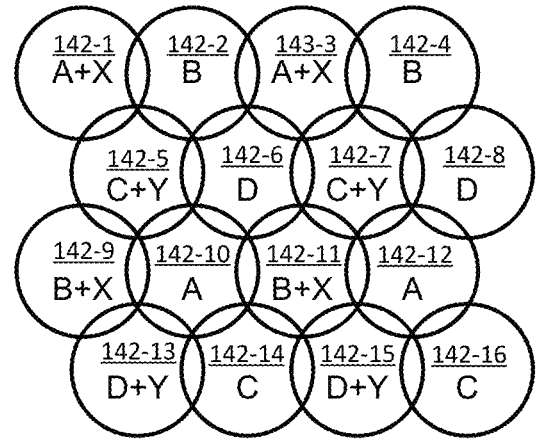
Figure 6B:
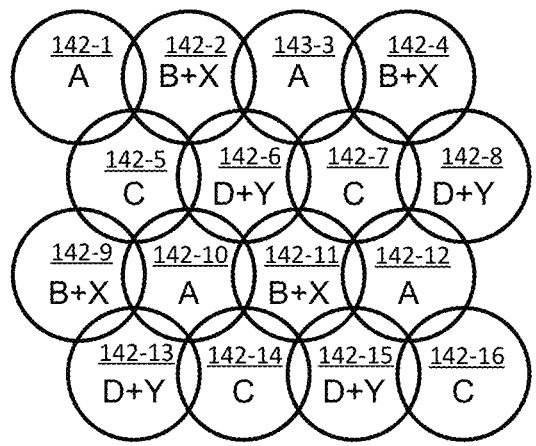

FIG. 6B depicts the spot beam cluster after reallocating both the reserved 'X' and 'Y' colors. In this example, the color 'X' is reassigned to each of the spot beams having a dedicated 'B' color assignment. Accordingly, spot beams 142-2, 142-4, 142-9, and 142-11 have color 'X' assigned to them such that they may operate using the frequency/polarization combinations corresponding to colors 'B' and 'X.' As such, the bandwidth is increased in these spot beams to include 275 MHz of the allocated downlink spectrum while the bandwidth in spot beams 142-1, 142-3, 142-10, and 142-12 is decreased to 225 MHz. Similarly, the reserved color 'Y' is reassigned to each of the spot beams having a dedicated 'D' color assignment. Accordingly, spot beams 142-6, 142-8, 142-13, and 142-15 have color 'Y' assigned to them such that they may operate using the frequency/polarization combinations corresponding to colors 'D' and 'Y.' As such, the bandwidth is increased to include 275 MHz of the allocated downlink spectrum while the bandwidth in the 'C' color spot beams is decreased to include 225 MHz of spectrum.

FIG. 6C depicts the spot beam cluster in another allocation where a subset of the 'A' color spot beams and a subset of the 'B' color spot beams are allocated the reserved 'X' color. In this specific example, the first row 'A' color spot beams 142-1 and 142-3 are allocated the reserved 'X' color, while in the third row, the 'B' color spot beams 142-9 and 142-11 are allocated the reserved color 'X.' Similarly, the second row 'C' color spot beams 142-5 and 142-7 are allocated the reserved 'Y' color, while in the fourth row, the 'D' color spot beams 142-13 and 142-15 are allocated the reserved 'Y' color. The allocations in FIG. 6C may be made in one example by switching the reserved color into the filter path for the selected spot beam of a pair of adjacent spot beams in one example.

Figure 6D:
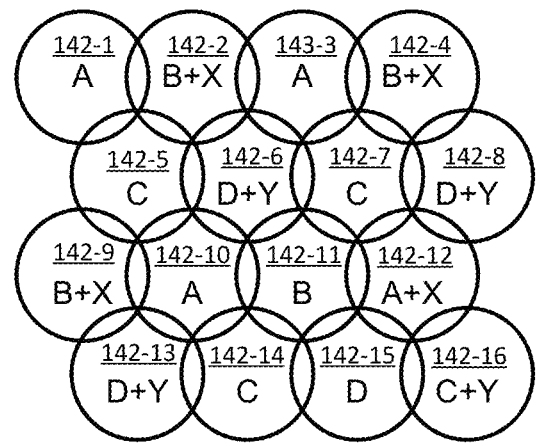

FIG. 6D depicts the spot beam cluster in yet another possible allocation where a subset of the 'A' color spot beams and a subset of the 'B' color spot beams are allocated the reserved 'X' color, while a subset of the 'C' color spot beams and a subset of the 'D' color spot beams are allocated the reserved 'Y' color. In this specific example, the first row 'B' color spot beams 142-2 and 142-4 are allocated the reserved 'X' color, while in the third row, one 'B' color spot beam 142-9 and one 'A' color spot beam 142-12 are allocated the reserved color 'X.' In the second row, the 'D' color spot beams 142-6 and 142-8 are allocated the reserved 'Y' color, while in the fourth row, one 'D' color spot beam 142-13 and one 'C' color spot beam 142-16 are allocated the reserved 'Y' color. Again, the allocations in FIG. 6D may be made in one example by switching the reserved color into the filter path for the selected spot beam of a pair of adjacent spot beams. In another example, the allocations can be made by passing the reserved FP combination 'X' to each of the 'A' and 'B' color spot beams, while a corresponding gateway or separate controller manages the FP combination 'X' such that channels from the reserved combination are only allocated for use by user terminals in one of two adjacent spot beams.

Figure 7:
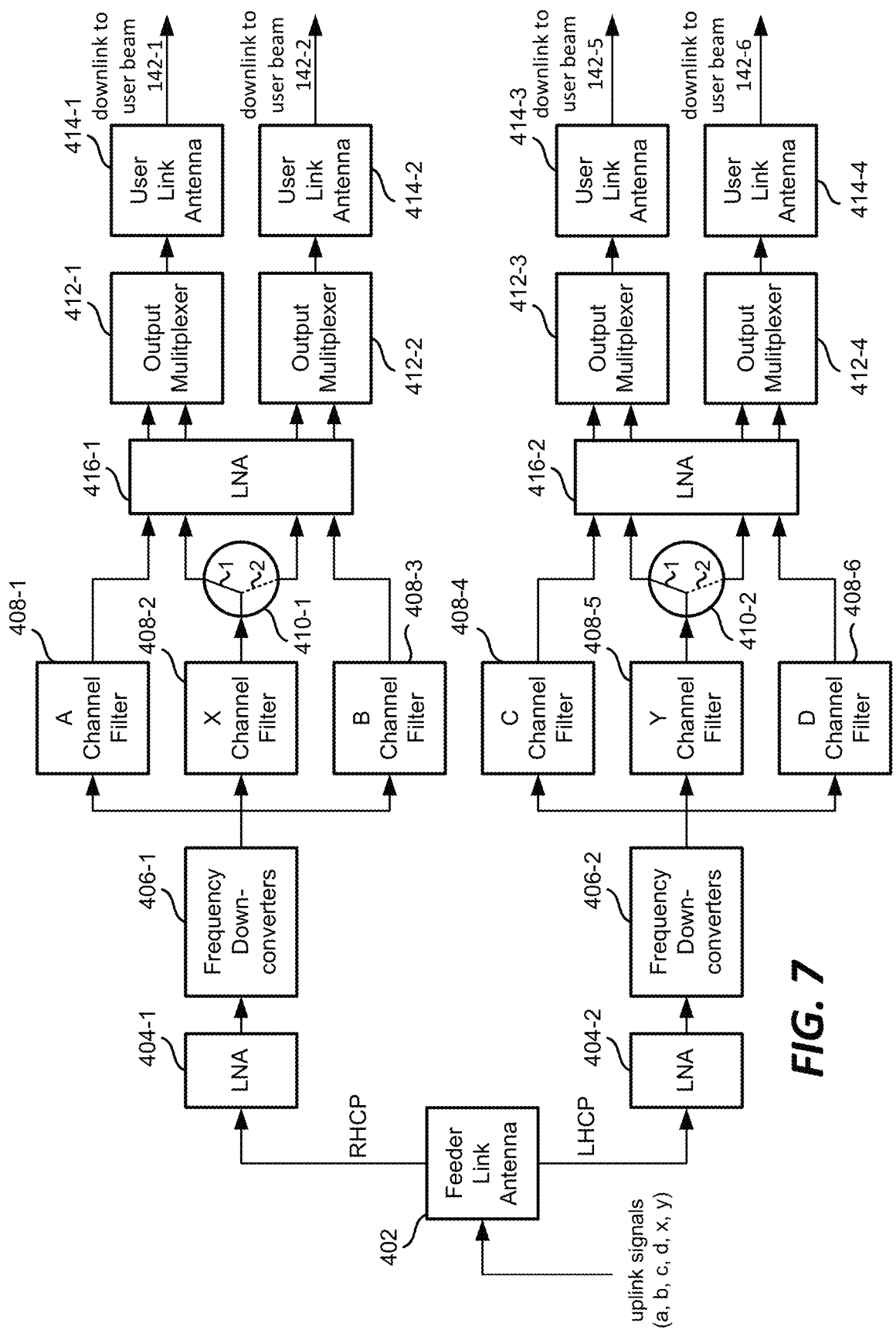
FIG. 7 is a simplified block diagram of a repeater circuit including filters for a plurality of spot beams with a switchable reserved combination of frequency and polarization in accordance with another embodiment.

FIG. 7 is a simplified circuit diagram of filter circuitry in accordance with one embodiment for a communications platform such as satellite 120 that generates four user spot beams. The filter circuitry receives forward uplink signals from a gateway and generates forward downlink signals for four user spot beams. For example, the filter circuitry may receive uplink signals from a gateway and generate four spot beams such as user beams 142-1, 142-2, 142-5, and 142-6.

Satellite 120 is communicatively coupled, via at least one feeder link antenna 402, to at least one gateway 110 (not shown), and via a plurality of user link antennas 414-1 to 414-4 to a plurality of user terminals 130 (not shown). Although four user link antennas are shown, other embodiments may include a single user link antenna configured to independently communicate with four separate coverage areas. The gateway and satellite communicate over at least one feeder link having a forward uplink and return downlink (not shown). The user terminals and satellite communicate over a plurality of user links, each having a forward downlink and return uplink (not shown). FIG. 7 generally depicts four filter paths that generate the forward downlink signals for four user beams. A first filter path generates downlink signals for a user beam such as 142-1 having a dedicated 'A' color assignment. A second filter path generates downlink signals for a user beam such as 142-2 having a dedicated 'B' color assignment. A third filter path generates downlink signals for a user beam such as 142-5 having a dedicated 'C' color assignment. A fourth filter path generates downlink signals for a user beam such as 142-6 having a dedicated 'D' color assignment.

The feeder link antenna may receive uplink signals from the gateway using the assigned colors corresponding to forward downlink signals for the user beams. For example, the feeder link antenna may receive uplink signals from a gateway using the colors 'a,' 'b,' 'c,' 'd,' 'x,' and 'y' as shown in FIG. 5A. The uplink signals 'a,' 'b,' and 'x' having a right hand circular polarization are routed to a first low-noise amplifier 404-1 and the uplink signals 'c,' 'd,' and 'y' having a left hand circular polarization (LHCP) are routed to a second low-noise amplifier 404-2. The received signals may be filtered (not shown) to extract only the frequency band corresponding to these colors prior to being provided to the LNA's. The amplified signals in the 'a,' 'b,' and 'x' colors are then downconverted using one or more frequency downconverters 406-1. The amplified signals in the 'c,' 'd,' and 'y' colors are downconverted using one or more frequency downconverters 406-2. The downconverted signals are passed through a bank of output channel filters 408 to extract the frequency ranges for the individual colors. A first dedicated color filter path or transmission line receives the downconverted signals from the frequency downconverter 406-1 at a first channel filter 408-1. Channel filter 408-1 filters for the frequency band corresponding to color 'A.' Channel filter 408-1 passes the filtered frequency band to an output LNA 416-1 which amplifies the signal and passes it to an output multiplexer 412-1. Output multiplexer 412-1 passes the frequency band for color 'A' to the user link antenna 414-1 for user beam 142-1. A second dedicated color filter path or transmission line receives the downconverted signals from the frequency downconverter 406-1 at channel filter 408-3. Channel filter 408-3 filters the downconverted signal to extract the frequency band corresponding to color 'B.' Channel filter 408-3 passes the filtered frequency band to LNA 416-1 which amplifies the signal and passes it to an output multiplexer 412-2. Output multiplexer 412-2 passes the frequency band for color 'B' to the user link antenna 414-2 for user beam 142-2.

The transmission lines for user beams 142-1 and 142-2 may selectively pass the reserved color 'X' to either of spot beams 142-1 or 142-2. The downconverted signals are also passed to an 'X' color channel filter 408-2. Channel filter 408-2 passes the frequency band of color 'X' to a switch 410-1. Switch 410-1 receives the signals in the X frequency band at an input and selectively provides the signals to either output multiplexer 412-1 or 412-2 through LNA 416-1. Switch 410-1 includes a first output that couples the X frequency band through a path in LNA 416-1 to an input of multiplexer 412-1 and a second output that couples the X frequency band through a path in LNA 416-1 to an input of multiplexer 412-2. The switch can be placed into a first position such that the output of channel filter 408-2 is passed to output multiplexer 412-1, and is not provided to output multiplexer 412-2. The switch can be placed into a second position such that the output of channel filter 408-2 is passed to output multiplexer 412-2, and is not provided to output multiplexer 412-1. In one example, switch 410-1 can be placed into the first position or the second position in response to a command signal from a gateway or a separate controller. In another example, switch 410-1 may be programmed to automatically switch at designated times or intervals. As described, the reserved frequency band and antenna polarization corresponding to color 'X' may be selectively placed or generated in the user beam 142-1 or user beam 142-2. In such a manner, the satellite will at one time only pass the reserved frequency band to one of the two adjacent spot beams. Uplink signals such as those in the uplink frequency band/polarization 'x' will be downconverted and selectively passed to user beam 142-1 and 142-2 based on the position of switch 410-1.

Similarly, the transmission lines for user beams 142-5 and 142-6 may selectively pass the reserved color 'Y' to either of the spot beams. The downconverted signals are passed to 'Y' color channel filter 408-5. The frequency band of color 'Y' is passed to switch 410-2. Switch 410-2 includes a first output that couples the Y frequency band through a path in LNA 416-2 to an input of multiplexer 412-3 and a second output that couples the Y frequency band through a path in LNA 416-2 to an input of multiplexer 412-4. The switch can be placed into a first position such that the output of channel filter 408-5 is passed to output multiplexer 412-3, and is not provided to output multiplexer 412-4. The switch can be placed into a second position such that the output of channel filter 408-5 is passed to output multiplexer 412-4, and is not provided to output multiplexer 412-3. Switch 410-2 can be operated in the same manner as, but independently of switch 410-1. In this manner, decisions and allocations of the 'Y' color can be made without regard to allocations of the 'X' color to user beams 142-1 and 142-2. It is noted, however, that allocations of the 'Y' color may be made by a controller that will consider the allocations in other pairs of user beams. For example, beams that are adjacent to beams 142-5 and 142-6 and that are serviced by other gateways using colors 'C' and 'D' and 'Y' may be considered before reallocating 'Y' within beams 142-5 and 142-6 to avoid interference.

Referring to FIG. 6A, the circuit of FIG. 7 may be configured with switch 410-1 in position 1 to assign reserved color 'X' to user beam 142-1. Similarly, circuit 410-2 may be configured in position 1 to assign reserved color 'Y' to user beam 142-5. Referring to FIG. 6B, the circuit of FIG. 7 may be configured with switch 410-1 in position 2 to assign reserved color 'X' to user beam 142-2. Similarly, circuit 410-2 may be configured in position 2 to assign reserved color 'Y' to user beam 142-6. The switches would both be in the first position for the frequency assignments shown in FIG. 6C and in the second position for the frequency assignments shown in FIG. 6D. It is noted that the switches may be in different positions. For example, switch 410-1 may be in the first position to assign color 'X' to user beam 142-1 while switch 410-2 is at the same time in the second position to assign color 'Y' to user beam 142-6.

Figure 8:
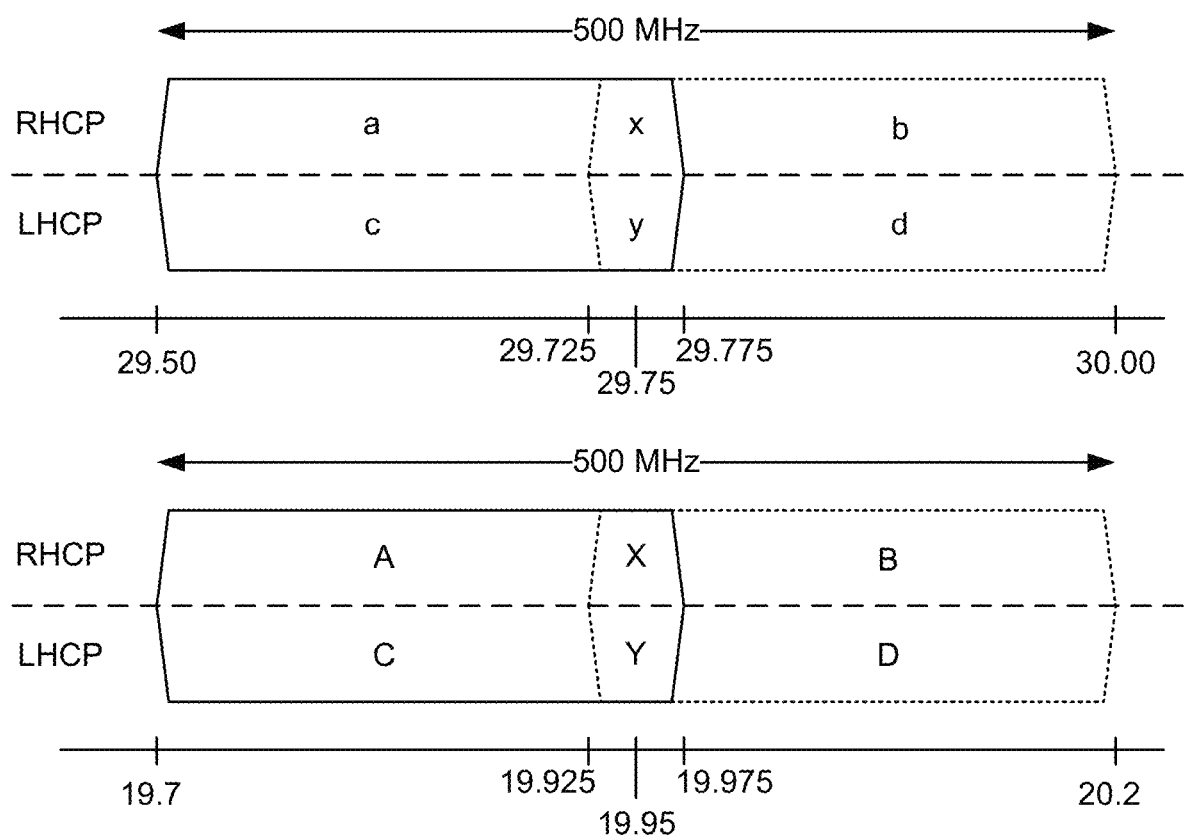
FIG. 8 is a diagram describing an example of unique combinations of frequency and polarization with dedicated combinations that include a reserved combination for flexible assignment in accordance with one embodiment.

FIG. 7 describes an embodiment that includes a separate filter path to generate the reserved color for selective inclusion in either of two adjacent spot beams. FIG. 8 describes an embodiment that does not include a separate filter path for the reserved color, but rather, includes the reserved color in the two adjacent spot beams at all times and intelligently manages use of the reserved color to avoid interference over the reserved color.

FIG. 8 is a diagram showing a flexible frequency band and antenna polarization allocation in a communications system for a set of uplink signals and downlink signals in accordance with one embodiment. In the specific example of FIG. 8, the uplink frequency band is again divided into four dedicated colors as in FIG. 5A. 50 MHz of spectrum is reserved in the frequency band 29.725 GHz to 29.775 GHz to create the reserved colors 'x' and 'y.' The downlink frequency band is also divided into four dedicated colors and 50 MHz of spectrum is reserved in the frequency band 19.925 GHz to 19.975 GHz to create reserved colors 'X' and 'Y.'

In contrast with FIG. 5A, the filter paths for the dedicated colors are designed so that the filter path for each color at all times passes one of the reserved colors in addition to the dedicated color. For example, a filter path of a spot beam allocated color 'a' will at all times pass the frequency and polarization combination for reserved color 'x.' At the same time, the filter path for an adjacent spot beam that is allocated color 'b' will at all times pass the frequency and polarization combination for reserved color 'x.' In this manner, the adjacent spot beams may at the same time be blanketed with energy corresponding to the FP combination of the reserved color 'x.' A controller will manage the channels within the reserved color 'x' to avoid interference between the adjacent spot beams at the same FP combination. In one example, the controller may allocate the channels within the reserved color 'x' so that at any given time the reserved channels are only allocated to terminals in one of the adjacent spot beams. In another example, the controller may allocate the reserved channels to terminals in both spot beams at the same time, but manages the assignments so that the channels are assigned to subsets of terminals in the two spot beams that are geographically isolated such that interference can be avoided. In yet another example, the controller may allocate a first subset of the reserved channels to user terminals in one spot beam while allocating a second subset of the reserved channels to user terminals in the adjacent spot beam.

Figure 9:
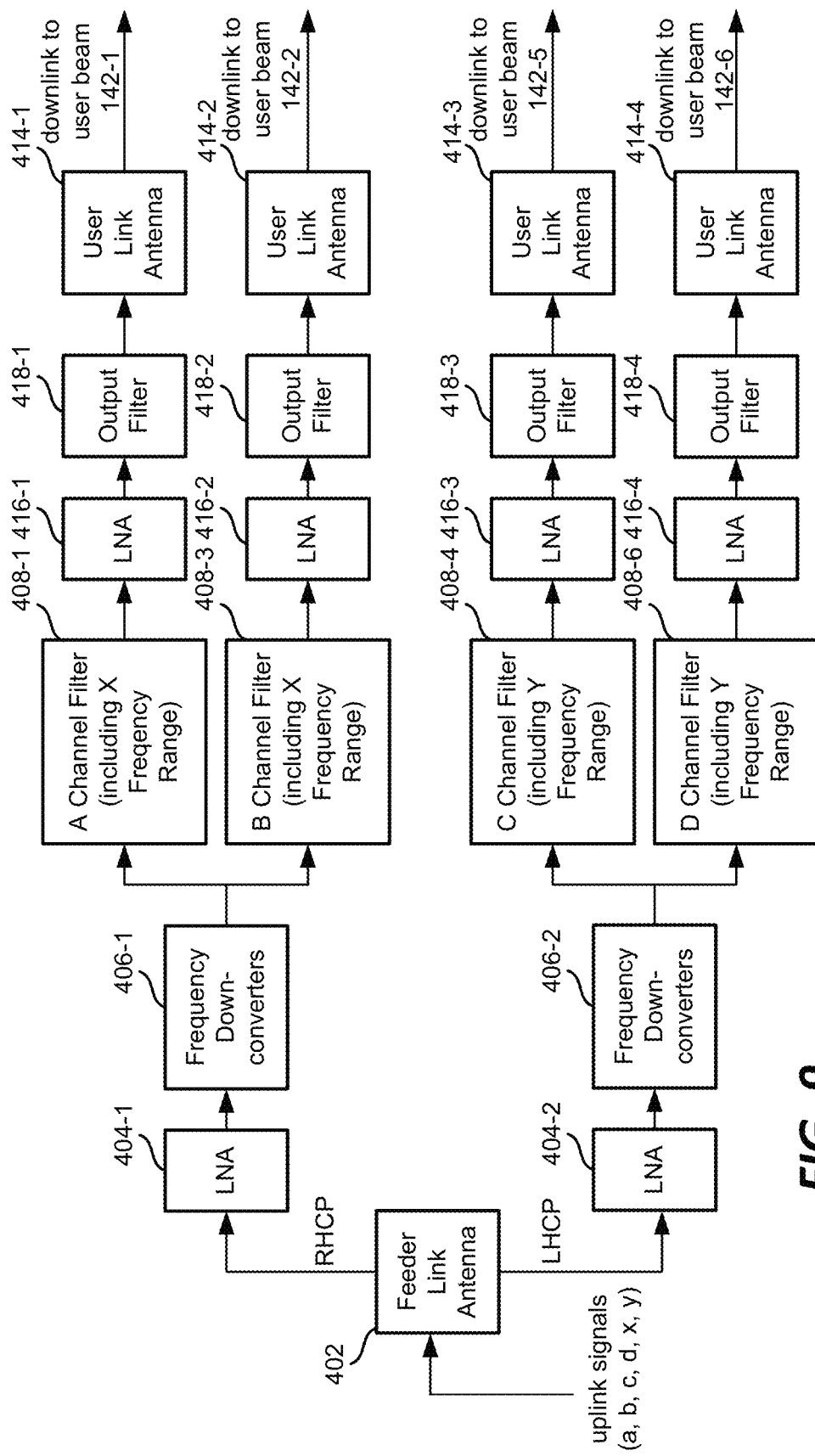
FIG. 9 is a simplified block diagram of a repeater circuit including filters for a plurality of spot beams including a reserved combination of frequency and polarization in accordance with one embodiment.

FIG. 9 is a simplified circuit diagram of filter circuitry in accordance with one embodiment that passes a reserved color to two adjacent spot beams. As with FIG. 7, the filter circuitry receives forward uplink signals from a gateway and generates forward downlink signals for four user spot beams. For example, the filter circuitry may receive uplink signals from one gateway and generate four spot beams such as user beams 142-1, 142-2, 142-5, and 142-6.

FIG. 9 generally depicts four filter paths that generate the forward downlink signals for four user beams. A first filter path generates downlink signals for user beam 142-1 having a dedicated 'A' color assignment. A second filter path generates downlink signals for user beam 142-2 having a dedicated 'B' color assignment. A third filter path generates downlink signals for user beam 142-5 having a dedicated 'C' color assignment. A fourth filter path generates downlink signals for user beam 142-6 having a dedicated 'D' color assignment.

The feeder link antenna may receive uplink signals from the gateway using the assigned colors (e.g., a, b, c, d, x, y) corresponding to forward downlink signals for the user beams. The uplink signals 'a,' 'b,' and 'x' having a right hand circular polarization are routed to a first low-noise amplifier 404-1 and the uplink signals 'c,' 'd,' and 'y' having a left hand circular polarization (LHCP) are routed to a second low-noise amplifier 404-2. The received signals may be filtered (not shown) to extract the frequency bands corresponding to these colors prior to being provided to the LNA's. The amplified signals in the 'a,' 'b,' and 'x' colors are then downconverted using one or more frequency downconverters 406-1. The amplified signals in the 'c,' 'd,' and 'y' colors are then downconverted using one or more frequency downconverters 406-2. The downconverted signals are passed through a bank of output channel filters 408 to extract the frequency ranges for the individual colors.

In FIG. 9, the output filters for each spot beam pass a dedicated FP combination color as well as a reserved FP combination color. Channel filter 408-1 filters the downconverted signals to extract signals in the FP combination corresponding to dedicated color 'A' and reserved color 'X.' Channel filter 408-1 passes the filtered frequency band to LNA 416-1. The amplified signal is passed through an output filer 418-1 to remove unwanted frequencies and then to the user link antenna 414-1 for user beam 142-1. Channel filter 408-3 filters the downconverted signals to extract signals in the FP combination corresponding to dedicated color 'B' and reserved color 'X.' Channel filter 408-3 passes the filtered frequency band to LNA 416-2. The amplified signal is passed through an output filter 418-2 and then to the user link antenna 414-2 for user beam 142-2. Thus, the transmission lines for user beams 142-1 and 142-2 pass both the respective frequency bands corresponding to their dedicated color assignment, and also the frequency band corresponding to the reserved color 'X.'

Channel filter 408-4 filters the downconverted signals to extract signals in the FP combination corresponding to dedicated color 'C' and reserved color 'Y.' Channel filter 408-4 passes the filtered frequency band to LNA 416-3. The amplified signal is passed through an output filter 418-3 and then to the user link antenna 414-3 for user beam 142-3. Channel filter 408-6 filters the downconverted signals to extract signals in the FP combination corresponding to dedicated color 'D' and reserved color 'Y.' Channel filter 408-6 passes the filtered frequency band to LNA 416-4. The amplified signal is passed through an output filter 418-4 and then to the user link antenna 414-4 for user beam 142-4. Thus, the transmission lines for user beams 142-5 and 142-6 pass the respective frequency bands corresponding to their dedicated color assignment, and also the frequency band corresponding to the reserved color 'Y.'

FIG. 9 depicts an example that includes a dedicated output LNA for each filter path. In another example, one LNA can be used to amplify the signals from the A channel filter 408-1 and the B channel filter 408-3. A second LNA can be used to amplify the signals from the C channel filter 408-4 and the D channel filter 408-6.

While adjacent spot beams receive energy in the reserved spectrum simultaneously, the channel filter design of FIGS. 8 and 9 may still provide for the selective allocation of channels in the reserved spectrum as shown in FIGS. 6A-6D. Referring to FIG. 6A and FIG. 9, the controller may assign channels within the 'X' color combination to terminals in spot beam 142-1 during the indicated time period. During this time period, the controller does not assign channels in the 'X' color combination to terminals in spot beam 142-2. In this manner, the system avoids interference between communications in the different spot beams. Although both spot beams 142-1 and 142-2 will include signals in the reserved 'X' color combination, only user terminals in spot beam 142-1 will be tuned to or otherwise attempt to communicate using the reserved spectrum. Thus, the presence of the reserved spectrum in both spot beams will not generate interference in either of the spot beams as only terminals in one of the spot beams communicate using the reserved spectrum.

Similarly, the controller may assign channels within the 'Y' color combination to terminals in spot beam 142-5. During this time period, the controller does not assign channels in the 'Y' color combination to terminals in spot beam 142-6, again avoiding interference between communications in the different spot beams. Although both spot beams 142-5 and 142-6 will include signals in the reserved 'Y' color combination, only user terminals in spot 142-5 will be tuned to or otherwise attempt to communicate using the reserved spectrum.

Referring to FIG. 6B, the controller may reallocate or reassign the reserved 'X' and 'Y' color combinations between the adjacent spot beams. During this second time period, the controller assigns channels within the 'X' color combination to user terminals in spot beam 142-2. The reassignment may include reassigning those terminals in spot beam 142-1 that were assigned channels in the reserved spectrum to channels in the dedicated 'A' color combination. The controller also reassigns channels within the 'Y' color combination to user terminals in spot beam 142-6. The reassignment may include reassigning those terminals in spot beam 142-5 that were assigned channels in the reserved spectrum to channels in the dedicated 'A' color combination. In this manner, the controller does not simultaneously assign channels in the reserved spectrum to user terminals in adjacent spot beams.

With reference to FIG. 6C, a second gateway may service spot beams 142-9, 142-10, 142-13, and 142-14. These spot beams may be serviced by an additional filter circuit of the satellite that is identical to that of FIG. 9. As such, the assignment of the reserved colors may be made independently for clusters of spot beams serviced by a single gateway. In FIG. 6C, the controller may allocate channels in the reserved 'X' color to spot beam 142-1 which is assigned the dedicated color 'A.' At the same time, the controller may allocate channels in the reserved 'X' color to spot beam 142-9, which is assigned the dedicated color 'B.' Similarly, the controller may allocate channels in the reserved 'Y' color to spot beam 142-5 which is assigned the dedicated color 'C.' At the same time, the controller may allocate channels in the reserved 'Y' color to spot beam 142-13, which is assigned the dedicated color 'D.' In FIG. 6D, the controller may allocate channels in the reserved 'X' color to spot beam 142-2 which is assigned the dedicated color 'B.' At the same time, the controller may allocate channels in the reserved 'X' color to spot beam 142-9, which is assigned the dedicated color 'B.' The controller may allocate channels in the reserved 'Y' color to spot beam 142-6 which is assigned the dedicated color 'D.' At the same time, the controller may allocate channels in the reserved 'Y' color to spot beam 142-13, which is assigned the dedicated color 'D.' In this manner, the controller does not simultaneously assign channels in the reserved spectrum to user terminals in adjacent spot beams.

In one embodiment, the wireless communication system is configured to simultaneously manage the assignment of a reserved spectrum to adjacent spot beams. The system may, for example, assign the same reserved spectrum to user terminals in adjacent spot beams while managing the assignment to avoid interference between communications to the user terminals using the same spectrum. The system assigns the reserved spectrum to a subset of terminals in one spot beam that are geographically isolated from a subset of user terminals in an adjacent spot beam in one example.

Figure 10A:
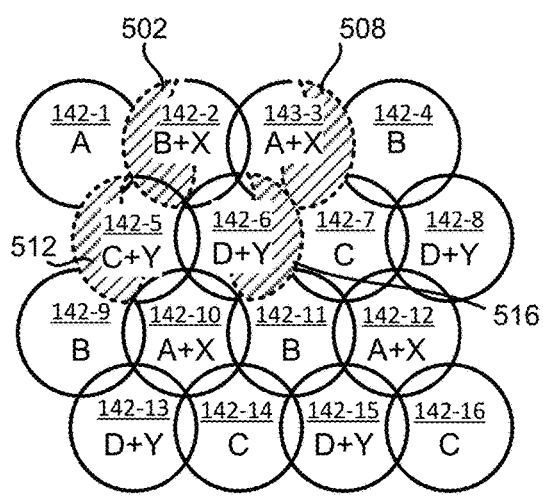
FIGS. 10A-10B are diagrams depicting a set of spot beams and a flexible allocation of a reserved combination of frequency and polarization to subsets of user terminals in spot beams according to one embodiment.
Figure 10B:
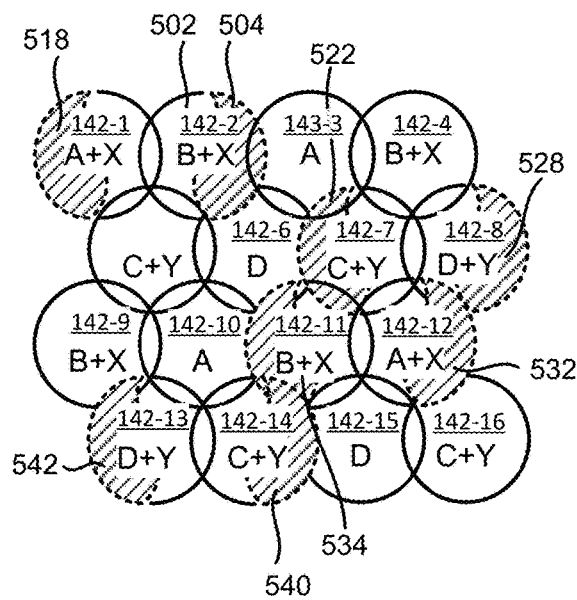

FIGS. 10A-10B describe a flexible bandwidth allocation for a set of spot beams in one embodiment that includes simultaneously managing the assignment of a reserved spectrum to adjacent spot beams. A cluster of spot beams similar to FIGS. 6A-6D is depicted including adjacent and at least partially overlapping spot beams having the same dedicated color 'A'-'D' assignments. In FIGS. 10A-10B, the filters for the spot beams having an 'A' or 'B' color assignment also pass the reserved 'X' color, and the filters for the spot beams having a 'C' or 'D' color assignment also pass the reserved 'Y' color. FIGS. 10A-10B show the assignments of color within the spot beams.

In FIG. 10A, spot beams 142-2 and 142-3 are both assigned the reserved 'X' color. Spot beams 142-2 and 142-3 are adjacent and partially overlapping such that communication to different terminals in the two spot beams using the same channel may lead to interference. The system manages the simultaneous assignment of channels within the reserved color to both spot beams to avoid interference. The system determines a first subset 502 of user terminals in spot beam 142-2 that are geographically isolated from a second subset 508 of user terminals in spot beam 142-3. The system may determine that the subsets are geographically isolated by determining that signal-to-interference ratios at the user terminals are within a threshold limit. After determining the first and second subsets of user terminals, the system assigns a set of channels from the reserved color to both the first and second subset of user terminals. Because the first subset is geographically isolated from the second subset, user terminals in the first subset may receive signals using the same channels as user terminals in the second subset without experiencing levels of interference beyond a threshold limit. FIG. 10A also shows the simultaneous assignment of the reserved color 'Y' to user beams 142-5 and 142-6. The system determines a subset 512 of user terminals in spot beam 142-5 that are geographically isolated from a subset 516 of user terminals in spot beam 142-6. The system assigns the same channels from reserved color 'Y' to the subset 512 of user terminals from user beam 142-5 and to the subset 516 of user terminals from user beam 142-6.

Figure 10C:
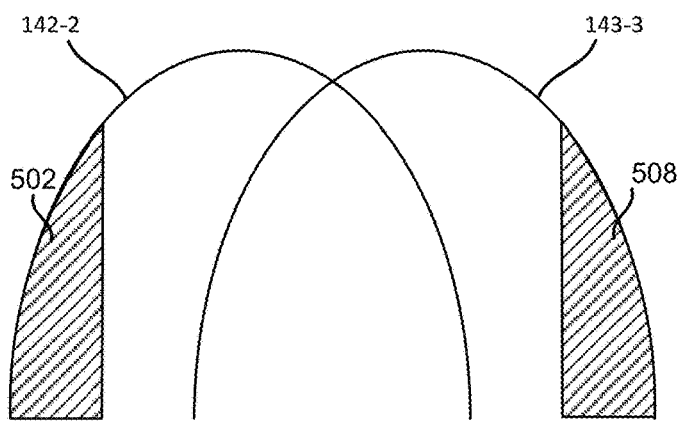
FIG. 10C is a side profile view of a pair of adjacent spot beams from FIG. 10A.

FIG. 10C depicts a side profile view of spot beams 142-2 and 143-3 under the assignment of FIG. 10A. The spot beams include an overlapping coverage area as shown. Within spot beam 142-2, the reserved color X is assigned to the first subset 502 of user terminals and within spot beam 142-3, the reserved color X is assigned to the second subset 508 of user terminals. The locations of the subsets of user terminals are shown by cross-hatching. The first subset 502 of user terminals is geographically isolated from the second subset 508 of user terminals such that the communication link between each subset and the satellite can be completed under an acceptable level of interference with the other subset.

In one embodiment, separate gateways are used to communicate with adjacent spot beams that are simultaneously assigned the same reserved color. In FIG. 10A for example, a first gateway may communicate with user beam 142-2 and a second gateway may communicate with user beam 142-3. In this manner, the first gateway may generate uplink signals to the satellite using the reserved uplink color 'x.' The first gateway generates the uplink signals for communicating with the subset of user terminals in user beam 142-2 using downlink signals in the reserved downlink color 'X.' Filter circuitry of satellite 120 receives the 'x' uplink signals from the first gateway in a first filter path and downconverts them for downlink signals in user beam 142-2. At the same time, the second gateway may generate uplink signals using the reserved uplink color 'x.' Filter circuitry of satellite 120 receives the 'x' uplink signals from the second gateway in a second filter path and downconverts them for downlink signals in user beam 142-3.

FIG. 10A also demonstrates that other user beams within a cluster may be allocated according to other techniques. For example, the entire reserved color may be assigned to some user beams without regard to geography according to the technique described in FIGS. 6A-6D while some user beams are assigned their dedicated color only. For example, user beam 142-1 is allocated only its dedicated color assignment 'A.' Likewise, user beams 142-4, 142-9, and 142-12 are allocated color 'B' only, and user beams 142-7, 142-14, and 142-16 are allocated color 'C' only. At the same time, user beams 142-10 and 142-12 are assigned dedicated color 'A' and reserved color 'X,' and user beams 142-8, 142-13, and 142-15 are assigned dedicated color 'D' and reserved color 'Y.'

FIG. 10B further demonstrates that the reserved colors may be flexibly used with different ones of the adjacent spot beams as well as reallocated within a single spot beam. In FIG. 10B, the reserved color 'X' is reassigned or reallocated within user beam 142-2 to a second subset 504 of user terminals. At the same time, the reserved color 'X' is allocated to a subset 518 of user terminals in user beam 142-1. The second subset 504 of user terminals in beam 142-2 is geographically isolated from a subset of user terminals in user beam 142-1. Reserved color 'X' is deallocated from user beams 142-3 and 142-10. Reserved color 'X' is allocated to user beams 142-4 and 142-9 without geographical limitation. Reserved color 'X' is allocated to a subset 534 of user terminals in spot beam 142-11 that are geographically isolated from a subset 532 of user terminals in spot beam 142-12.

The reserved color 'Y' is reassigned or reallocated within user beam 142-5 without geographical limitation. Reserved color 'Y' is deallocated from user beams 142-6 and 142-15. Reserved color 'Y' is allocated to user beam 142-16 without geographical limitation. Reserved color 'Y' is allocated to a subset 522 of user terminals in spot beam 142-7 that are geographically isolated from a subset 528 of user terminals in spot beam 142-8 to which the color 'Y' 'is also allocated. Reserved color 'Y' is allocated to a subset 542 of user terminals in spot beam 142-13 that are geographically isolated from a subset 540 of user terminals in spot beam 142-14 to which the color 'Y' 'is also allocated.

In one embodiment, the wireless communication system is configured to simultaneously manage the assignment of different portions of a reserved color to adjacent spot beams. The system may, for example, assign a first portion of a reserved color to user terminals in one spot beam while simultaneously assigning a second portion of the reserved color to user terminals in an adjacent spot beam. For example, the system may assign a first subset of channels from a reserved color to a subset of user terminals in the first spot beam, while assigning a second subset of channels form the reserved color to a subset of user terminals in the second, adjacent spot beam.

Figure 11A:
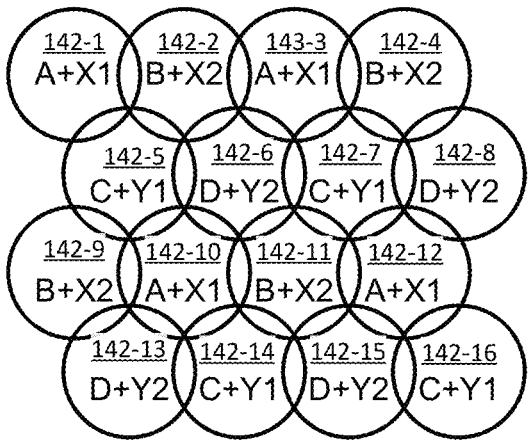
FIGS. 11A-11C are diagrams depicting a set of spot beams and a flexible allocation of subsets of a reserved combination of frequency and polarization to spot beams according to one embodiment.
Figure 11C:
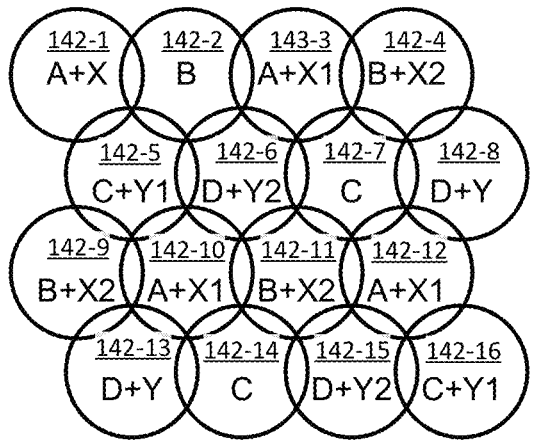
Figure 11B:
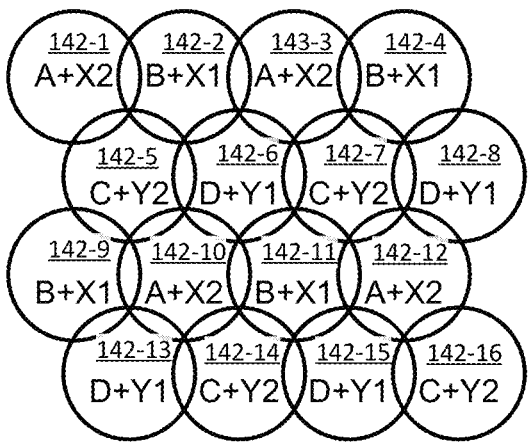

FIGS. 11A-11C describe a flexible bandwidth allocation for a set of spot beams in one embodiment that includes simultaneously managing the assignment of portions of a reserved color to adjacent spot beams. A cluster of spot beams similar to FIGS. 6A-6D is again depicted including adjacent and at least partially overlapping spot beams having the same dedicated color 'A'-'D' assignments. In FIGS. 11A-11C, the filters for the spot beams having an 'A' or 'B' color assignment also pass the reserved 'X' color, and the filters for the spot beams having a 'C' or 'D' color assignment also pass the reserved 'Y' color. FIGS. 11A-11C show the assignments of color within the spot beams.

In FIG. 11A, spot beams 142-1, 142-3, 142-10, and 142-12 are allocated a first subset of channels X1 from the reserved 'X' color. At the same time, spot beams 142-2, 142-4, 142-9, and 142-11 are assigned a second subset of channels X2 from the reserved 'X' color. Interference is avoided because the adjacent spot beams use different subsets of the channels within the reserved spectrum. It is noted that the size or number of channels in the subsets of a reserved color may be different. For example, X1 may include more channels than X2. Moreover, the number of channels referenced by X1 in one spot beam may be different than the number of channels referenced by X1 in another spot beam.

Similarly, spot beams 142-5, 142-7, 142-14, and 142-16 are allocated a first subset of channels Y1 from the reserved 'Y' color. At the same time, spot beams 142-6, 142-8, 142-13, and 142-15 are assigned a second subset of channels Y2 from the reserved 'Y' color. Interference is avoided because the adjacent spot beams use different subsets of the channels within the reserved spectrum. Again, the size or number of channels in the subsets of reserved color 'Y' may be different.

FIG. 11B further demonstrates that the subsets of channels for reserved colors may be flexibly reassigned. In FIG. 11B, spot beams 142-1, 142-3, 142-10, and 142-12 are allocated the second subset of channels X2 from the reserved 'X' color. At the same time, spot beams 142-2, 142-4, 142-9, and 142-11 are assigned the first subset of channels X2. Similarly, user beams 142-5, 142-7, 142-14, and 142-16 are allocated the second subset of channels Y2 from the reserved 'Y' color. At the same time, spot beams 142-6, 142-8, 142-13, and 142-15 are assigned the first subset of channels Y2. Where the sizes of the subsets are different, the reassignments may be used to reallocate bandwidth between the spot beams.

FIG. 11C demonstrates that the use of subsets within a reserved color for adjacent spot beams may be used for some spot beams, while other spot beams are allocated the reserved spectrum in different manners. In FIG. 11C, the subset of the reserved color 'X' is deallocated from user beam 142-2, and all of reserved color 'X' is reallocated to user beam 142-1. Similarly, the subset of the reserved color 'Y' is deallocated from user beams 142-7 and 142-14, so that all of reserved color 'Y' can be reallocated to user beams 142-8 and 142-13.

Figure 12:
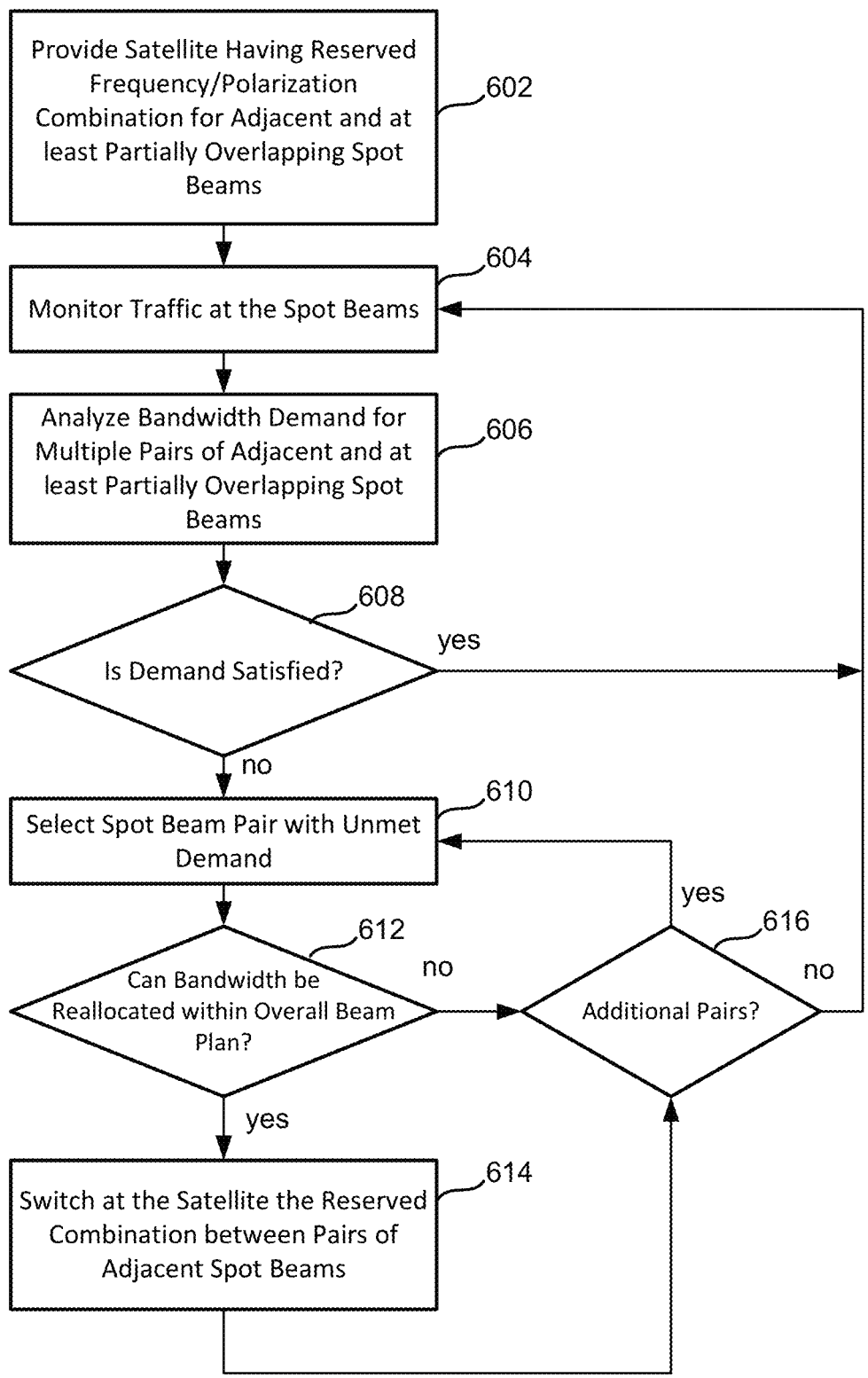
FIG. 12 is a flowchart describing a process of flexibly assigning bandwidth to adjacent spot beams in accordance with one embodiment.

FIG. 12 is a flowchart describing a process of flexibly assigning bandwidth to spot beams in a wireless communication system according to one embodiment. At step 602, a satellite is provided that has a reserved combination of frequency band and antenna polarization for pairs of adjacent and at least partially overlapping spot beams. As has been described, a unique combination of frequency band and antenna polarization may be referred to as a color. Step 602 may include in one example, providing a separate filter for the reserved color as shown in FIG. 7. In this example, the satellite may include a switch that can respond to signals from the ground or elsewhere to selectively include the reserved color in one of two adjacent spot beams. In another example, the satellite may provide a filter for each of the adjacent spot beams that passes the reserved color for inclusion in both spot beams at the same time. A controller at a gateway or elsewhere can assign the reserved color to terminals in one of the spot beams at a given time to avoid interference.

At step 604, the controller monitors traffic at each of the spot beams. Step 604 can include real-time monitoring to make dynamic allocations of bandwidth between spot beams. In another example, step 604 may include periodic assessments of bandwidth usage by the spot beams to make adjustments to the bandwidth allocations. For example, the controller may assess on an hourly, daily, weekly, monthly, quarterly basis the bandwidth usage by the spot beams. At step 606, the controller analyzes the bandwidth demand for multiple pairs of adjacent spot beams to which a reserved bandwidth may be allocated.

In one example, the controller determines for pairs of adjacent spot beams the relative bandwidth demand for each spot beam. For example, step 606 may include determining the amount of bandwidth used for each of two adjacent spot beams over a period of time. The controller can determine whether bandwidth demand for either spot beam has been over capacity or under capacity for the current bandwidth allocations to each.

At step 608, the controller determines whether the bandwidth demands for each spot beam of each spot beam pair have been satisfied. If both spot beams of each pair are currently servicing the bandwidth demands within the spot beam, the process returns to step 604 to continue monitoring traffic at the spot beams. If either of the spot beams of any pair currently has unmet demand, the controller selects one of the pairs at step 610. At step 612, the controller determines whether bandwidth can be reallocated between the spot beams of the pair for improved service. For example, if a first spot beam of a pair has unmet demand, the controller may determine whether the second spot beam of the pair is currently assigned the reserved color available to the pair. If so, the controller determines whether the second spot beam can meet its demand if the reserved color is reallocated to the first spot beam. Step 612 can include assessing the spectrum allocations and usages in any adjacent spot beams as well. Thus, step 612 includes checking the overall beam plan to determine whether the reallocation can be performed without creating unacceptable interference levels in any spot beams. The system determines whether the reserved color can be reallocated to the first spot beam without creating interference in any other spot beams that may be operating at the reserved color and that are adjacent to the first spot beam. If reallocating the reserved color to the first spot beam of a pair would cause interference in another spot beam, the system can determine whether the other spot beam may have spectrum reallocated while meeting bandwidth demands. If the reserved spectrum cannot be reallocated within a pair of spot beams for improved service, the process returns to step 604 to continue monitoring traffic.

If the bandwidth can be reallocated within the pair to improve service without causing interference, the reserved color is reallocated between the individual spot beams of the pair at step 614. In one embodiment, step 614 includes switching at the satellite the reserved combination of frequency and polarization from inclusion in a first spot beam of a pair to inclusion in a second spot beam of the pair. For example, step 614 may include sending a command form the controller to the satellite to remove the reserved color from the second spot beam of a pair and to include the reserved color in the first spot beam of the pair. In one embodiment, the command may be a signal that causes a switch on the satellite to change position as shown in FIG. 7. In another embodiment, step 614 can include reassigning the reserved color from terminals in the first spot beam to terminals in the second spot beam. In one example, the reassignment is performed without switching on the satellite. A filter circuit as shown in FIG. 9 can be used to include the reserved spectrum in both spot beams of a pair. The controller at step 614 reassigns the reserved spectrum so that it is only used in one spot beam of the pair. After reassigning the reserved spectrum, the process proceeds to step 614 to determine whether there are additional spot beams with unmet demand to be analyzed.

Figure 13:
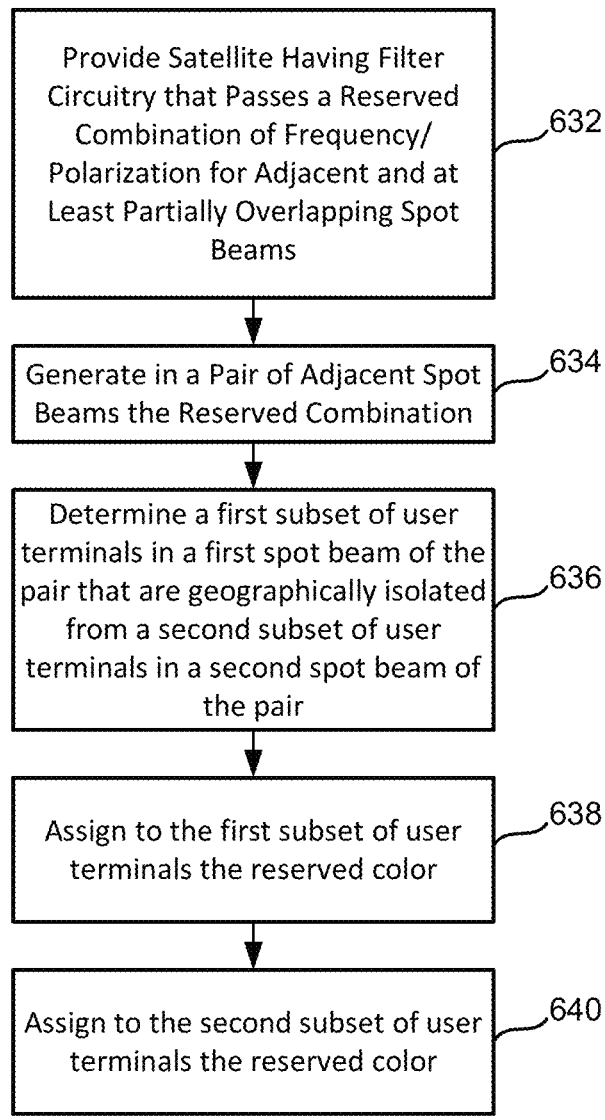
FIG. 13 is a flowchart describing a process of flexibly assigning bandwidth to subsets of user terminals in adjacent spot beams in accordance with one embodiment.

FIG. 13 is a flowchart describing a process of flexibly assigning bandwidth to spot beams in a wireless communication system according to one embodiment. In one embodiment, the process of FIG. 13 can be used with the frequency re-use and reallocation shown in FIGS. 10A-10B. At step 632, a satellite is provided that has a reserved combination 632 of frequency band and antenna polarization for at least two adjacent and at least partially overlapping spot beams. Step 630 includes providing filter circuitry aboard the satellite that passes the reserved color for inclusion in both spot beams of a pair at the same time.

At step 634, the satellite generates a plurality of spot beams including the pair of adjacent spot beams. For the pair of spot beams, the satellite generates in both spot beams at the same time signals using the reserved color. At step 636, the controller determines for a pair of spot beams a first subset of user terminals in the first spot beam that are geographically isolated from a second subset of user terminals in the second spot beam. Step 636 may include assessing signal-to-interference (S/I) ratios at each of the user terminals in the two subsets. The S/I ratios may be measured or predicted in one example. The controller can create the first and second subsets such that the maximum S/I ratio for any user terminal in either subset is below a maximum threshold level with respect to communications in the spot beam adjacent to the sub set.

At step 638, the controller assigns to the first subset of user terminals in the first spot beam the reserved color. At step 640, the controller assigns to the second subset of user terminals in the second spot beam the reserved color. Step 638 can include assigning to the first subset of user terminals a set of channels using the reserved color. Step 640 can include assigning the second subset of user terminals the same set of channels using the reserved color.

Figure 14:
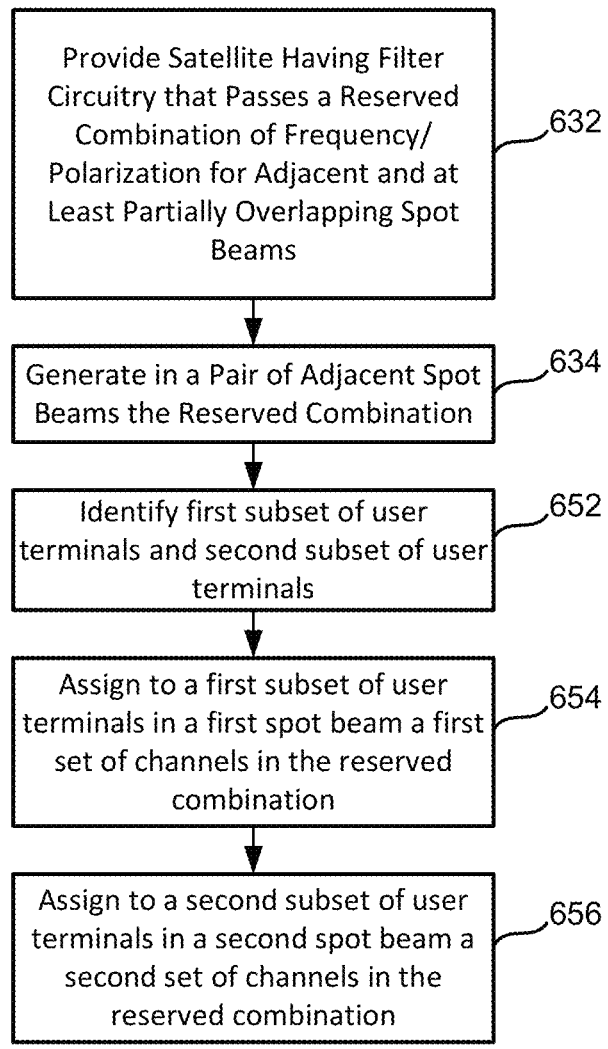
FIG. 14 is a flowchart describing a process of flexibly assigning subsets of a reserved combination of frequency and polarization to adjacent spot beams in accordance with one embodiment.

FIG. 14 is a flowchart describing a process of flexibly assigning bandwidth to spot beams in a wireless communication system according to one embodiment. In one embodiment, the process of FIG. 14 can be used with the frequency re-use and reallocation shown in FIGS. 11A-11C. FIG. 14 includes steps 632 and 634 described in FIG. 13 whereby a satellite is provided that has a reserved combination of frequency band and antenna polarization and generates plurality of spot beams including at least one pair of adjacent spot beams to which the reserved combination is passed. For the pair of spot beams, the satellite generates in both spot beams at the same time signals using the reserved color. At step 652, the controller identifies a first subset of user terminals in the first spot beam and a second subset of user terminals in the second spot beam. Step 652 is not made with respect to geographic isolation in one embodiment as the subsets can merely be random user terminals within each of the spot beams.

At step 654, the controller assigns to the first subset of user terminals in the first spot beam a first portion of the reserved color. At step 656, the controller assigns to the second subset of user terminals in the second spot beam a second portion of the reserved color. Step 654 can include assigning to the first subset of user terminals a first set of channels using the reserved color. Step 656 can include assigning to the second subset of user terminals a second set of channels using the reserved color. In this manner, although the reserved color is distributed in its entirety to both spot beams by the satellite, only portions of the reserved color are used in each of the adjacent spot beams.

The channel assignments in steps 654 and 656 do not have to be of the same number, although they can be. For example, the controller may assess bandwidth usage, demand, etc. as described in FIG. 12 in one embodiment. The controller can determine a proportionate amount of the reserved color that can be assigned to each spot beam to meet the assessed demand. Additionally, the controller may perform the process of FIG. 14 continuously or periodically. For example, the controller may reassign channels to meet known changes in demand for adjacent spot beams. The controller may increase the number of channels in one spot beam while decreasing the number of channels in an adjacent spot beam as the bandwidth increases in one spot beam and decreases in another. This may be experienced across time zones for example. As a subset of user terminals increase demand in one spot beam in one time zone, a subset of user terminals in the adjacent spot beam may decrease demand.

Accordingly, there has been described a method of operating a satellite system that includes providing by a satellite a first spot beam, providing by the satellite a second spot beam that is adjacent to and at least partially overlaps the first spot beam, generating the first spot beam to include a first combination of frequency and polarization and a reserved combination of frequency and polarization during a first time period, generating the second spot beam to include a second combination of frequency and polarization during the first time period, generating the first spot beam to include the first combination during a second time period, and generating the second spot beam to include the second combination and the reserved combination during the second time period.

There has been described a method of operating a satellite system that includes providing at a satellite a first filter circuit for a first spot beam. The first filter circuit passes a first combination of frequency and polarization and a reserved combination of frequency and polarization. The first user beam is associated with a first coverage area. The method includes providing at the satellite a second filter circuit for a second spot beam. The second filter passes a second combination of frequency and polarization and the reserved combination. The second spot beam is associated with a second coverage area that is adjacent to and at least partially overlaps the first coverage area. The method includes generating during a first time period the first spot beam to include the first combination and the reserved combination, generating during the first time period the second user beam to include the second combination and the reserved combination, generating during a second time period the first user beam to include the first combination and the reserved combination, and generating during the second time period the second user beam to include the second combination and the reserved combination.

In one embodiment, the method includes generating during a second time period the first user beam to include the first combination and the reserved combination, generating during the second time period the second user beam to include the second combination and the reserved combination, assigning to one or more user terminals in the first coverage area one or more channels from the reserved combination during the first time period, and assigning to one or more user terminals in the second coverage area the one or more channels from the reserved combination during the second time period.

In one embodiment, the reserved combination is a reserved downlink combination of frequency and polarization, the first combination is a first downlink combination of frequency and polarization and the second combination is a second downlink combination of frequency and polarization.

In one embodiment, the method includes generating at least one feeder uplink signal using a first uplink combination of frequency and polarization, a second uplink combination of frequency and polarization, and a reserved uplink combination of frequency and polarization. The feeder uplink signal encodes data for the one or more user terminals in the first coverage area using the reserved uplink combination of frequency and polarization during the first time period, and the feeder uplink signal encodes data for the one or more user terminals in the second coverage area using the reserved uplink combination of frequency and polarization during the second time period.

A method has been described that includes receiving at least one feeder uplink signal at a satellite including a first combination of uplink frequency and polarization, a second combination of uplink frequency and polarization, and a reserved combination of uplink frequency and polarization. The method includes generating a first user beam including a first combination of downlink frequency and polarization and a reserved combination of downlink frequency and polarization based on downconverting the first combination of uplink frequency and polarization and the reserved combination of uplink frequency and polarization. The method includes generating a second user beam including a second combination of downlink frequency and polarization and the reserved combination of downlink frequency and polarization based on downconverting the second combination of uplink frequency and polarization and the reserved combination of uplink frequency and polarization. The method includes determining a first bandwidth usage associated with the first user beam and a second bandwidth usage associated with the second user beam, and allocating the reserved combination of downlink frequency and polarization to the first user beam and the second user beam based on the first bandwidth usage and the second bandwidth usage.

A method of operating a satellite system has been described that includes accessing a satellite having a first spot beam circuit that passes a first combination of frequency and polarization and a reserved combination of frequency and polarization. The satellite includes a second spot beam circuit that passes a second combination of frequency and polarization and the reserved combination. The first spot beam circuit provides a first spot beam associated with a first coverage area and the second spot beam circuit provides a second spot beam associated with a second coverage area that is adjacent to and at least partially overlaps the first coverage area. During a first time period, the method includes assigning to one or more user terminals in the first coverage area the first combination of frequency and polarization and a first portion of the reserved combination of frequency and polarization, and assigning to one or more user terminals in the second coverage area the second combination of frequency and polarization and a second portion of the reserved combination of frequency and polarization.

A method of operating a satellite system has been described that includes accessing a satellite having a first spot beam circuit that passes a first combination of frequency and polarization and a reserved combination of frequency and polarization. The satellite has a second spot beam circuit that passes a second combination of frequency and polarization and the reserved combination of frequency and polarization. The first spot beam circuit provides a first spot beam associated with a first coverage area and the second spot beam circuit provides a second spot beam associated with a second coverage area that is adjacent to and at least partially overlaps the first geographic coverage area. The method includes determining a first bandwidth requirement associated with the first user beam and a second bandwidth requirement associated with the second user beam, and allocating a first portion of the reserved combination for the first user beam and a second portion of the reserved combination for the second user beam. The first portion of the reserved combination is larger than the second portion of the reserved combination when the first bandwidth requirement is larger than the second bandwidth requirement, and the second portion of the reserved combination is larger than the first portion of the reserved combination when the second bandwidth requirement is larger than the first bandwidth requirement.

In one embodiment, the method includes assigning to a first set of user terminals in the first geographic coverage area a first set of channels from the first portion of the reserved combination, assigning to a second set of user terminals in the second geographic coverage area a second set of channels form the second portion of the reserved combination. A number of the first set of channels is larger than a number of the second set of frequency channels in response to the first bandwidth requirement being larger than the second bandwidth requirement and the number of the second set of channels is larger than the number of the first set of frequency channels in response to the second bandwidth requirement being larger than the first bandwidth requirement.

A method of operating a satellite system has been described that includes accessing a satellite having a first spot beam circuit that passes a first combination of frequency and polarization and a reserved combination of frequency and polarization. The satellite has a second spot beam circuit that passes a second combination of frequency and polarization and the reserved combination of frequency and polarization. The first spot beam circuit provides a first spot beam associated with a first coverage area and the second spot beam circuit provides a second spot beam associated with a second coverage area that is adjacent to and at least partially overlaps the first coverage area. The method includes determining a first set of one or more user terminals in the first coverage area that are geographically isolated from a second set of one or more user terminals in the second coverage area, and during a first time period, assigning to the first set of one or more user terminals in the first coverage area the reserved combination and assigning to the second set of one or more user terminals in the second coverage area the reserved combination.

A method of operating a satellite has been described that includes providing at least one feeder uplink signal, the at least one feeder uplink signal including a first uplink combination of uplink frequency and polarization, a second uplink combination of uplink frequency and polarization, and a reserved uplink combination of uplink frequency and polarization. The first uplink combination and the reserved uplink combination are converted using a first repeater to generate a first user beam including a first downlink combination of downlink frequency and polarization from the first uplink combination and a reserved downlink combination of downlink frequency and polarization from the reserved uplink combination. The second uplink combination and the reserved uplink combination are converted using a second repeater to generate a second user beam including a second downlink combination of frequency and polarization from the second uplink combination and the reserved downlink combination. During a first time period, the method includes assigning to a first set of user terminals in the first coverage area a plurality of channels based on the reserved downlink combination and the first downlink combination and assigning to a second set of user terminals in the second coverage area a plurality of channels based on the second downlink combination. During the first time period the method includes generating the at least one feeder uplink signal to include data for the first set of user terminals using the first uplink combination and the reserved uplink combination and to include data for the second set of user terminals using the second uplink combination. During a second time period, the method includes assigning to the second set of user terminals a plurality of channels based on the reserved downlink combination and the second downlink combination and assigning to the first set of user terminals a plurality of channels based on the first downlink combination. During the second time period, the method includes generating the at least one feeder uplink signal to include data for the second set of user terminals using the second uplink combination and the reserved uplink combination and to include data for the first set of user terminals using the first uplink combination.

A satellite has been described that includes a first receiver that receives an uplink feed signal from at least one gateway, and a downconverter in communication with the first receiver that provides a downconverted signal based on the uplink feed signal. The satellite includes a first filter circuit that receives the downconverted signal and provides a first filtered signal having a first combination of frequency and polarization corresponding to a first user beam, a second filter circuit that receives the downconverted signal and provides a second filtered signal having a second combination of frequency and polarization corresponding to a second user beam, and a third filter circuit that receives the downconverted signal and provides a third filtered signal having a reserved combination of frequency and polarization. The satellite includes a switch having an input that receives the third filtered signal, a first output that provides the third filtered signal when the switch is in a first position, and a second output that provides the third filtered signal when the switch is in a second position. The satellite includes a first multiplexer having a first input that receives the first filtered signal and a second input that receives the first output of the switch. The first multiplexer has an output that combines the first input and the second input to generate the first user beam. The satellite includes a second multiplexer having a first input that receives the second filtered signal and a second input that receives the second output of the switch. The second multiplexer has an output that combines the first input and the second input to generate the second user beam.

A method has been described that includes converting a feeder uplink signal to a downconverted signal, filtering the downconverted signal to generate a first output signal having a first combination of frequency and polarization, a second output signal having a second combination of frequency and polarization, and a reserved output signal having a reserved combination of frequency and polarization. The method includes during a first time period when bandwidth usage in a first coverage area exceeds bandwidth usage in a second coverage area, generating a first user beam associated with the first coverage area by combining the first output signal and the reserved output signal and generating a second user beam associated with the second coverage area using the second output signal. The method includes during a second time period when bandwidth usage in the second coverage area exceeds bandwidth usage in the first coverage area, generating the first user beam using the first output signal and generating the second user beam by combining the second output signal and the reserved output signal.

In one embodiment, the first time period is a first predetermined time period during a day and the second time period is a second predetermined time period during the day. In one embodiment, the method includes monitoring bandwidth usage in the first geographic coverage area and the second geographic coverage area, determining during the first time period that bandwidth usage in the first coverage area exceeds bandwidth usage in the second coverage area, and determining during the second time period that bandwidth usage in the second geographic coverage area exceeds bandwidth usage in the first geographic coverage area.

A method has been described that includes generating at least one feeder uplink signal. The at least one feeder uplink signal includes a first uplink color, a second uplink color, and a reserved uplink color. The first uplink color is converted by a spacecraft to generate a first user beam including a first downlink color. The second uplink color is converted by the spacecraft to generate a second user beam including a second downlink color. The reserved uplink color is converted by the spacecraft to generate a signal including a reserved downlink color that is switchable between the first user beam and the second user beam. During a first time period when bandwidth usage in a first coverage area associated with the first user beam exceeds bandwidth usage in a second coverage area associated with the second user beam, the method includes assigning to a first set of user terminals in the first coverage area a plurality of channels from the reserved downlink color and a plurality of channels from the first downlink color, and generating the at least one uplink signal to include data for the first set of user terminals using the reserved uplink color and the first uplink color. During the first time period, the method includes assigning to a second set of user terminals in the second geographic coverage area a plurality of channels from the second downlink color, and generating the at least one uplink signal to include data for the second set of user terminals using the second uplink color. During a second time period when bandwidth usage in the second coverage area exceeds bandwidth usage in the first coverage area, the method includes assigning to the second set of user terminals the plurality of channels from the second downlink color and the plurality of channels from the reserved downlink color, and generating the at least one uplink signal to include data for the second set of user terminals using the second uplink color and the reserved uplink color.

In one embodiment, the method includes sending at least one command to the spacecraft to switch the signal including the reserved downlink color for the first user beam for the first time period and to switch the signal including the reserved downlink color for the second user beam for the second time period.

A method of operating a satellite system has been described that includes converting a feeder uplink signal to a downconverted signal, and filtering the downconverted signal to generate a first output signal having a first color, a second output signal having a second color, and a reserved output signal having a reserved color. During a first time period when bandwidth usage in a first coverage area exceeds bandwidth usage in a second coverage area, the method includes generating a first user beam associated with the first coverage area by combining the first output signal and the reserved output signal and generating a second user beam associated with the second coverage area using the second output signal. During a second time period when bandwidth usage in the second coverage area exceeds bandwidth usage in the first coverage area, the method includes generating the first user beam using the first output signal and generating the second user beam by combining the second output signal and the reserved output signal.

A method of operating a satellite system has been described that includes during a first time period, receiving a first return uplink signal from a first coverage area associated with a first user beam where the return uplink signal includes a first uplink combination of frequency and polarization and a reserved uplink combination of frequency and polarization. During the first time period, the method includes receiving a second return uplink signal from a second coverage area associated with a second spot beam where the second return uplink signal including a second uplink combination of frequency and polarization. The first spot beam is adjacent to and at least partially overlaps the second spot beam. The method includes generating a gateway beam during the first time period including a return downlink signal where the return downlink signal includes a first downlink combination of frequency and polarization with data from the first coverage area, a reserved downlink combination of frequency and polarization with data from the first coverage area, and a second downlink combination of frequency and polarization with data from the second coverage area. During a second time period, the method includes receiving the first return uplink signal from the first coverage area including the first uplink combination of frequency and polarization and receiving the second return uplink signal from the second coverage area where the second return uplink signal includes the second uplink combination of frequency and polarization and the reserved uplink combination of frequency and polarization. The method includes generating the gateway beam during the second time period including the return downlink signal where the return downlink signal includes the first downlink combination of frequency and polarization with data from the first coverage area, the second downlink combination of frequency and polarization with data from the second coverage area, and the reserved downlink combination of frequency and polarization with data from the second coverage area.

A method of operating a satellite system has been described that includes receiving a first return uplink signal from one or more user terminals in a first coverage area. The first return uplink signal includes a first set of channels from a first uplink combination of frequency and polarization and a first set of reserved channels from a reserved uplink combination of frequency and polarization. The method includes receiving a second return uplink signal from one or more user terminals in a second coverage area. The second return uplink signal includes a second set of channels from a second uplink combination of frequency and polarization and a second set of reserved channels from the reserved uplink combination. The method includes downconverting the first uplink combination and the reserved uplink combination from the first user beam to form a first downlink signal including a first downlink combination of frequency and polarization and a reserved downlink combination of frequency and polarization. The method includes downconverting the second uplink combination and the reserved uplink combination from the second user beam to from a second downlink signal including a second downlink combination of frequency and polarization and the reserved downlink combination of frequency and polarization. The method includes combining the first downlink signal and the second downlink signal to generate a gateway beam.

In one embodiment, the method includes during a first time period, assigning to the one or more user terminals in the first coverage area the first set of reserved channels from a first portion of the reserved uplink combination, and during the first time period, assigning to the one or more user terminals in the second coverage area the second set of reserved channels from a second portion of the reserved uplink combination.

In one embodiment, the method includes during a second time period, assigning to the one or more user terminals in the first coverage area the second set of channels, and during the second time period, assigning to the one or more user terminals in the second coverage area the first set of channels.

A satellite has been described that includes a first filter circuit configured to generate a first spot beam. The first filter circuit passes a first combination of frequency and polarization and a reserved combination of frequency and polarization. The first spot beam is associated with a first coverage area. The satellite includes a second filter circuit configured to generate a second spot beam. The second filter circuit passes a second combination of frequency and polarization and the reserved combination of frequency and polarization. The second spot beam is associated with a second coverage area that is adjacent to and at least partially overlaps the first coverage area. The satellite includes a first antenna configured to transmit during a first time period the first spot beam including the first combination and the reserved combination, and a second antenna configured to transmit during the first time period the second spot beam including the second combination and the reserved combination.

A satellite communication control system has been described that includes an antenna configured to transmit to a satellite at least one feeder uplink signal including a first uplink combination of frequency and polarization, a second uplink combination of frequency and polarization, and a reserved uplink combination of frequency and polarization. The satellite generates a first user beam including a first downlink combination of frequency and polarization from the first uplink combination and a reserved downlink combination of frequency and polarization from the reserved uplink combination. The satellite generates a second user beam including a second downlink combination of frequency and polarization from the second uplink combination and the reserved downlink combination from the reserved uplink combination. The satellite includes one or more processors configured to assign during a first time period a plurality of channels based on the reserved downlink combination and the first downlink combination to a first set of terminals in a first coverage area associated with the first spot beam. The one or more processors are configured to assign during the first time period a plurality of channels based on the second downlink combination to a second set of terminals in a second coverage area associated with the second spot beam. The first coverage area is adjacent to and at least partially overlaps the second coverage area. The one or more processors are configured to assign to the second set of terminals during a second time period a plurality of channels based on the reserved downlink combination and the second downlink combination. The one or more processors are configured to assign to the first set of terminals during the second time period a plurality of channels based on the first downlink combination.

In one embodiment, the satellite communication control system includes a feeder circuit configured to generate the at least one feeder uplink signal. The feeder circuit is configured to include data for the first set of terminals in the at least one feeder uplink signal using the first uplink combination and the reserved uplink combination during the first time period. The feeder circuit is configured to include data for the second set of terminals in the at least one feeder uplink signal using the second uplink combination during the first time period. The feeder circuit is configured to include data for the first set of terminals in the at least one feeder uplink signal using the first uplink combination during the second time period. The feeder circuit is configured to include data for the second set of terminals in the at least one feeder uplink signal using the second uplink combination and the reserved uplink combination during the second time period.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. A method of operating a satellite system, comprising:
    accessing a satellite having a first spot beam circuit that passes a first combination of frequency and polarization and a reserved combination of frequency and polarization, the satellite having a second spot beam circuit that passes a second combination of frequency and polarization and the reserved combination, the first spot beam circuit provides a first spot beam associated with a first coverage area and the second spot beam circuit provides a second spot beam associated with a second coverage area that is adjacent to and at least partially overlaps the first coverage area, wherein the first combination, the second combination and the reserved combination are distinct;
    during a first time period, concurrently assigning to one or more user terminals in the first coverage area the first combination of frequency and polarization and a first portion of the reserved combination of frequency and polarization; and
    during the first time period, concurrently assigning to one or more user terminals in the second coverage area the second combination of frequency and polarization and a second portion of the reserved combination of frequency and polarization.

2. The method of claim 1, further comprising:
    during a second time period, concurrently assigning to the one or more user terminals in the first coverage area the first combination and a third portion of the reserved combination; and
    during the second time period, concurrently assigning to the one or more user terminals in the second coverage area a fourth portion of the reserved combination.

3. The method of claim 2, wherein:
    the first portion of the reserved combination and the fourth portion of the reserved combination include a first set of channels that are the same; and
    the second portion of the reserved combination and the third portion of the reserved combination include a second set of channels that are the same.

4. The method of claim 2, wherein:
    assigning the third portion of the reserved combination to the one or more user terminals in the first coverage area and assigning the fourth portion of the reserved combination to the one or more user terminals in the second coverage area is performed in response to an indication of a larger bandwidth usage in the first coverage area than in the second coverage area; and the third portion of the reserved combination includes a larger number of channels than the first portion of the reserved combination and the fourth portion of the reserved combination includes a smaller number of frequencies than the second portion of the reserved combination of frequency and polarization.

5. The method of claim 1, further comprising:

filtering an input signal to generate a first filtered signal including the first combination, a second filtered signal including the second combination, and a third filtered signal including the reserved combination;

combining the first filtered signal with the third filtered signal during the first time period to generate a first output signal for the first spot beam; and combining the second filtered signal with the third filtered signal during the second time period to generate a second output signal for the second spot beam.

6. The method of claim 5, further comprising:

providing the first filtered signal to a first multiplexer, the first multiplexer providing the first output signal for the first spot beam;

providing the second filtered signal to a second multiplexer, the second multiplexer providing the second output signal for the second spot beam;

providing the third filtered signal to a switch;

placing the switch in a first position to provide the third filtered signal to the first multiplexer during the first time period; and placing the switch in a second position to provide the third filtered signal to the second multiplexer during the second time period.

7. The method of claim 1, wherein the spot beam is a user beam.

8. The method of claim 1, wherein the spot beam is a gateway beam.

* * * * *